US009004830B2

(12) United States Patent
Ura et al.

(10) Patent No.: US 9,004,830 B2
(45) Date of Patent: Apr. 14, 2015

(54) ROTARY JOINT DEVICE, METHOD OF MACHINING ROTARY JOINT DEVICE, AND MAIN SHAFT DRIVING APPARATUS FOR MACHINE TOOL INCLUDING ROTARY JOINT DEVICE

(75) Inventors: Hiroshi Ura, Kanazawa (JP); Masayuki Minamide, Kanazawa (JP)

(73) Assignee: Tsudakoma Kogyo Kabushiki Kaisha, Kanazawa-Shi (JP)

( * ) Notice: Subject to any disclaimer, the term of this patent is extended or adjusted under 35 U.S.C. 154(b) by 725 days.

(21) Appl. No.: 13/369,877

(22) Filed: Feb. 9, 2012

(65) Prior Publication Data

US 2012/0263551 A1    Oct. 18, 2012

(30) Foreign Application Priority Data

Apr. 15, 2011    (JP) ................. 2011-091141

(51) Int. Cl.
*F16L 39/04* (2006.01)
(52) U.S. Cl.
CPC ........ *F16L 39/04* (2013.01); *Y10T 409/307672* (2015.01); *Y10T 409/308456* (2015.01); *Y10T 409/300672* (2015.01)
(58) Field of Classification Search
CPC ............ F16L 39/00; F16L 39/04; F16L 39/06
USPC ........................................ 409/201, 211, 216
See application file for complete search history.

(56) References Cited

U.S. PATENT DOCUMENTS

| 3,853,328 | A | * | 12/1974 | Pierce ........................... 277/589 |
| 2002/0017785 | A1 | | 2/2002 | Omiya et al. |
| 2008/0113537 | A1 | | 5/2008 | Imai et al. |
| 2011/0031744 | A1 | * | 2/2011 | Takahashi et al. ............ 285/351 |

FOREIGN PATENT DOCUMENTS

| DE | 3016589 A | * | 11/1981 |
| JP | H06-69590 U | | 9/1994 |
| JP | 2009-270721 A | | 11/2009 |
| WO | WO 2006080280 A1 | * | 8/2006 |

OTHER PUBLICATIONS

Extended European Search Report for corresponding European Application No. 12000918.8 mailed on Aug. 30, 2012 (4 pages).

* cited by examiner

*Primary Examiner* — Daniel Howell
*Assistant Examiner* — Michael Vitale
(74) *Attorney, Agent, or Firm* — Yoshida & Associates, LLC

(57) ABSTRACT

A rotary joint device includes attachment grooves formed at positions in an outer peripheral surface of an outer cylinder, each attachment groove being formed so as to straddle a pair of adjacent cylindrical blocks and so as to be exposed from the outer peripheral surface of the outer cylinder, each attachment groove having a bottom surface that is machined to form a flat surface in a state in which the cylindrical blocks are combined, and positioning blocks corresponding to the attachment grooves on a one-to-one basis and each having an attachment phase that is uniquely set to a corresponding one of the attachment grooves in the axial direction and in a circumferential direction of the outer cylinder, each positioning block having an attachment surface corresponding to the bottom surface of a corresponding one of the attachment grooves, the attachment surface being machined so as to form a flat surface.

4 Claims, 9 Drawing Sheets

ROTARY JOINT DEVICE, METHOD OF MACHINING ROTARY JOINT DEVICE, AND MAIN SHAFT DRIVING APPARATUS FOR MACHINE TOOL INCLUDING ROTARY JOINT DEVICE

BACKGROUND OF THE INVENTION

1. Field of the Invention

The present invention relates to a rotary joint device in which a fluid channel of an outer cylinder and a fluid channel of a rotating shaft communicate with each other, and in particular, to a rotary joint device including an outer cylinder that is formed by combining a plurality of cylindrical blocks in an axial direction.

2. Description of the Related Art

Such rotary joint devices are widely used to connect pipes and apparatuses that rotate relative to each other. For example, such rotary joint devices are built in a main shaft driving apparatus that is mounted in a machine tool and that includes a main shaft that supports a device to be rotated and that is rotated by a driving device. The rotary joint devices are used to supply and drain a coolant, a hydraulic fluid, or the like between the machine tool and the device to be rotated.

Japanese Examined Utility Model Registration Application Publication No. 7-54712 (Patent Document 1) discloses an example of such rotary joint devices. The rotary joint device disclosed in Patent Document 1 is an outer-cylinder-connected-type rotary joint device in which an outer cylinder is fitted onto a rotating shaft. The outer cylinder includes a plurality of fixed cylindrical bodies (which correspond to "cylindrical blocks" in the present invention) that are divided in accordance with the types of supplied fluids and that are connected to each other. Seal rings are interposed between the fixed cylindrical bodies and the rotating shaft (strictly speaking, an inner sleeve that is fixed to the rotating shaft and that rotates together with the rotating shaft) to prevent leakage of fluids between the fixed cylindrical bodies.

As described above, a rotary joint device is used in a machine tool by connecting a rotating shaft of the rotary joint device to a supply-side main shaft that is rotated by a driving device. In this case, when the outer cylinder and the rotating shaft rotate relative to each other, friction between seal members and the rotating shaft generates rotational resistance, and thereby a load is applied to the driving device that rotates the main shaft connected to the rotating shaft. In particular, in the case of an outer-cylinder-connected-type rotary joint apparatus as disclosed in Patent Document 1, a high load is applied to the driving device because a seal ring is provided for each port and a mechanical seal is provided for each fixed cylindrical body so that there are a large number of seal members.

Therefore, the driving device needs to be designed in consideration of such a load and a motor having a high output power needs to be used as a drive source. Accordingly, the driving device is increased in size. As the driving device and the motor are increased in size, the manufacturing cost increases.

Some driving devices include, for example, a direct drive motor (so-called DD motor) as the drive source. The DD motor has a motor rotor that is disposed coaxially with the main shaft and directly connected to the main shaft, and the DD motor rotates the main shaft without using a speed-reducing device such as gears or the like. Therefore, a load applied to the driving apparatus due to the rotational resistance of the rotary joint device acts on the DD motor without being reduced by the speed-reducing device such as gears or the like. Thus, it is necessary to use a DD motor having a high output power in accordance with the load.

The higher the output power of a DD motor, the larger the outside diameter and the length of the DD motor. However, there are limitations on the outside diameter and the length of the DD motor because the driving apparatus is mounted in a machine tool having a limited installation space. Therefore, the output power of a usable DD motor is limited, so that it is necessary to reduce a load applied to the driving apparatus by reducing the rotational resistance of the rotary joint device.

In the case of the outer-cylinder-connected-type rotary joint apparatus disclosed in Patent Document 1, a high load is applied to the driving apparatus because there are a large number of seal members, which are provided for every port. Therefore, in order to reduce a load applied to the driving apparatus, it is preferable to reduce the number of the seal members provided for every port of the fixed cylindrical body or to eliminate the seal members. However, if simply the number of the seal members is reduced or the seal members are eliminated, a large amount of fluid leaks through the clearance between an inner peripheral surface of the outer cylinder and the rotating shaft to the outside of a fluid channel of the port through which the fluid is supplied. Therefore, the pressure of the supplied fluid cannot be maintained at the pressure needed by a device to be rotated.

In order to further reduce a load applied to the driving apparatus, an oil seal or the like that causes a lower friction may be used instead of a mechanical seal provided for each fixed cylindrical body. However, the oil seal or the like cannot prevent leakage of a fluid between the fixed cylindrical bodies, because the oil seal or the like cannot resist the pressure of the fluid that leaks through the clearance. As a result, different types of fluids in adjacent fixed cylindrical bodies become mixed with each other and form an emulsion, so that the fluid cannot be reused after being recovered.

The clearance described above (so-called diametrical clearance) may be reduced in order to maintain the pressure of a supplied fluid at the pressure needed by the device to be rotated and to suppress leakage of the fluid between the fixed cylindrical bodies. The pressure needed by the device to be rotated is, for example, a hydraulic pressure or a pneumatic pressure in the range of about 3.5 to 6.9 MPa. Needless to say, it is necessary to supply the fluid to the rotary joint device with a pressure higher than this. For example, by making the clearance be equal to or smaller than 0.005 mm, various fluids supplied to the ports can be separated from one another in a nearly liquid-tight or airtight manner.

However, if the diametrical clearance of the outer-cylinder-connected-type rotary joint apparatus is reduced, it becomes very difficult to assemble the fixed cylindrical bodies of the outer cylinder. This is particularly the case when reassembling the rotary joint apparatus such that the clearance between the fixed cylindrical bodies and the rotating shaft becomes the same as that before being disassembled for maintenance or the like. If the clearance is not made the same as that before disassembling, the amount of fluid that leaks through the clearance to the outside of the fluid channel increases, and the pressure of the fluid cannot be maintained at the pressure needed by the device to be rotated. Moreover, if the fixed cylindrical body and the rotating shaft interfere with each other, rotational resistance due to the interference causes a high load for the driving apparatus and prevents the driving apparatus from smoothly rotating the device to be rotated. Furthermore, due to the interference, abrasion or scoring occurs between the outer cylinder and the rotating shaft of the rotary joint device, which causes the rotary joint device to malfunction.

SUMMARY OF THE INVENTION

Therefore, an object of the present invention is to provide a rotary joint device that includes an outer cylinder including a plurality of cylindrical blocks combined in the axial direction, with which the cylindrical blocks of the outer cylinder can be reassembled such that the clearance between each cylindrical block and the rotating shaft becomes the same as that before being disassembled, that is, with which the state of assembly before being disassembled and the state of assembly after being reassembled can be made to coincide with each other with high precision.

According to a first aspect of the present invention, a rotary joint device includes an outer cylinder including a plurality of cylindrical blocks combined in an axial direction; a rotating shaft rotatably supported in the outer cylinder by two bearing that are disposed away from each other in the axial direction of the outer cylinder; at least one fluid channel formed in each of the cylindrical blocks of the outer cylinder, each of the fluid channels having an opening in an inner peripheral surface of a corresponding one of the cylindrical blocks; and a connection groove provided so as to correspond to each of the fluid channels and formed in at least one of an inner peripheral surface of a corresponding one of the cylindrical blocks and an outer peripheral surface of the rotating shaft facing the inner peripheral surface, each of the connection grooves communicating with a corresponding one of the fluid channels, the fluid channels in the outer cylinder and fluid channels formed in the rotating shaft so as to communicate with the connection grooves communicating with each other through the connection grooves.

The rotary joint device further includes a plurality of attachment grooves formed at a plurality of positions in an outer peripheral surface of the outer cylinder, each of the attachment grooves being formed so as to straddle a pair of adjacent cylindrical blocks and so as to be exposed from the outer peripheral surface of the outer cylinder, each of the attachment grooves having a bottom surface that is machined to form a flat surface in a state in which the pair of cylindrical blocks are combined; and a plurality of positioning blocks corresponding to the plurality of attachment grooves on a one-to-one basis and each having an attachment phase that is uniquely set with respect to the attachment grooves in the axial direction and in a circumferential direction of the outer cylinder, each of the positioning blocks having an attachment surface corresponding to the bottom surface of a corresponding one of the attachment grooves, the attachment surface being machined so as to form a flat surface.

In the description above, the meaning of the phrase "corresponding . . . on a one-to-one basis" is that the correspondence between the attachment grooves and the positioning blocks is uniquely set. In other words, there is a correspondence between the attachment grooves and the positioning blocks such that, when reattaching the positioning blocks to the attachment grooves after temporary removal, the positioning blocks can be reattached to the attachment grooves to which the positioning blocks were attached before the removal.

In the description above, the meaning of the phrase "attachment phase that is uniquely set" is that the orientation with which each of the positioning blocks is attached to a corresponding one of the attachment grooves has only one pattern with respect to the up-down direction and the left-right direction (circumferential direction) of the outer cylinder. In other words, the orientation with which the positioning block is reattached to the attachment groove after temporary removal is always the same as that when the positioning block was attached to the attachment groove before the removal, and the orientation of the positioning block with respect to the up-down direction and the circumferential direction of the outer cylinder do not change.

In the rotary joint device according to the first aspect of the present invention, the bearings may be disposed at both ends of the outer cylinder that is integrally formed by assembling the cylindrical blocks and each of the bearings may have a structure that does not cause displacement of a shaft axis. The phrase "bearings . . . have a structure that does not cause displacement of a shaft axis" refers to, for example, ball bearings or roller bearings having a shaft-alignment function, such as angular contact ball bearings and self-aligning roller bearings.

According to a second aspect of the present invention, a method of machining a rotary joint device includes forming a plurality of attachment grooves at a plurality of positions in an outer peripheral surface of the outer cylinder at which each of the attachment grooves straddles a pair of adjacent cylindrical blocks, each of the attachment grooves having a bottom surface that is machined to form a flat surface in a state in which the pair of cylindrical blocks are combined, the attachment grooves being formed so as to be exposed from the outer peripheral surface of the outer cylinder; attaching a plurality of positioning blocks such that each of the positioning blocks straddles a pair of adjacent cylindrical blocks, the positioning blocks corresponding on a one-to-one basis to the attachment grooves and having an attachment phase that is uniquely set with respect to a corresponding one of the attachment grooves in the axial direction and in a circumferential direction of the outer cylinder, each of the positioning blocks having an attachment surface corresponding to the bottom surface of a corresponding one of the attachment grooves, the attachment surface being machined so as to form a flat surface; and grinding an inner peripheral surface of the outer cylinder in a state in which bottom surfaces of the attachment grooves of pairs of the adjacent cylindrical blocks are fixed to the same plane by using the positioning blocks.

According to a third aspect of the present invention, a main shaft driving apparatus for a machine tool including the rotary joint device includes a main shaft connected to the rotating shaft of the rotary joint device; and a driving device that rotates the main shaft, wherein the driving device is a direct drive motor including a motor rotor and a motor stator, the motor rotor being coaxially disposed around the main shaft and connected to the main shaft, the motor stator being disposed on a frame of the main shaft driving apparatus so as to face an outer periphery or an inner periphery of the motor rotor.

In the description above, the term "main shaft driving apparatus" refers to an apparatus including a main shaft that supports a device to be rotated and that is rotated by a driving device. The main shaft driving apparatus is, for example, a C-axis driving apparatus for a machine tool, a machining head, a spindle unit, or a rotary table device for a machine tool. The C-axis driving apparatus for a machine tool includes a main shaft that supports a machining head, which is a device to be rotated, and the main shaft is rotated by a driving device around an axis (so-called C-axis) that is parallel to the Z-axis of the machine tool. The machining head includes a main shaft that supports a spindle unit, which is a device to be rotated, and the main shaft is rotated by a driving device. The spindle unit includes a spindle to which a tool is attached and that is rotated by a driving device. The rotary table device for a machine tool includes a main shaft that supports a rotary table, which is a device to be rotated, and the main shaft is rotated by a driving device.

The rotary joint device according to the first aspect of the present invention, which is an example of the outer-cylinder-connected-type rotary joint apparatus described above, includes a plurality of attachment grooves and a plurality of positioning blocks. The attachment grooves are formed at a plurality of positions in an outer peripheral surface of the outer cylinder, and each of the attachment grooves is formed so as to straddle a pair of adjacent cylindrical blocks and has a bottom surface that is machined to form a flat surface in a state in which the pair of cylindrical blocks are combined. The positioning blocks, which are attached to the attachment grooves, each has an attachment surface corresponding to the bottom surface of a corresponding one of the attachment grooves and being machined so as to form a flat surface. Therefore, by configuring the positioning blocks such that the positioning blocks can be attached to two or more positions on the outer peripheral surface of the outer cylinder in a state in which each of the petitioning blocks straddles a pair of adjacent cylindrical blocks, each pair of adjacent cylindrical blocks of the outer cylinder can be assembled such that the axes thereof are positioned with respect to two or more different directions that are perpendicular to the axis of the outer cylinder.

Moreover, the positioning blocks are not randomly attached to the attachment grooves. Instead, the positioning blocks are attached to the attachment grooves such that the positioning blocks correspond to the attachment grooves on a one-to-one basis and such that the attachment phase of each of the positioning blocks with respect to a corresponding one of the attachment grooves in the axial direction and the circumferential direction of the outer cylinder is uniquely set. Therefore, by attaching the positioning blocks to the corresponding attachment grooves with the set attachment phases, the state of assembly of the pairs of adjacent cylindrical blocks, which have been positioned as described above, can be always maintained. Therefore, when reassembling the outer cylinder after temporarily disassembling the outer cylinder, the state of assembly of each pair of adjacent cylindrical blocks can be made to coincide with high precision to that before being disassembled. Thus, when reassembling the cylindrical blocks of the outer cylinder after disassembling the outer cylinder, the clearances between the cylindrical blocks and the rotating shaft can be made the same as those before disassembling.

Therefore, in the case where the number of seal members provided for each port is reduced or the seal members are eliminated in order to reduce a load applied to the driving device, even if the diametrical clearance between the inner peripheral surface of the outer cylinder and the rotating shaft is reduced in order to maintain the pressure of fluid supplied to each ports at the pressure needed by a device to be rotated, the cylindrical blocks of the outer cylinder can be easily assembled so as to maintain the clearance between the outer cylinder and the rotating shaft. As a result, a load applied to the driving apparatus due to the rotary joint device can be reduced, and thereby many types of fluids can be supplied and drained without increasing the size of a motor. Because a smaller motor can be used, the manufacturing cost of the apparatus can be reduced.

In the rotary joint device according to the first aspect of the present invention, by using bearings that are disposed at both ends of the outer cylinder that is integrally formed by assembling the cylindrical blocks and that have a structure that does not cause displacement of a shaft axis, the position of the shaft axis of the rotating shaft can be always made that same as that of the outer cylinder. As a result, even if the diametrical clearance between the inner peripheral surface of the outer cylinder and the rotating shaft is reduced in order to maintain the pressure of fluid for each port at the pressure needed by the device to be rotated, the rotating shaft can rotate while maintaining the clearance.

With the method of machining the rotary joint device according to the second aspect of the present invention, in the outer-cylinder-type rotary joint device described above, a plurality of attachment grooves are formed at a plurality of positions in an outer peripheral surface of the outer cylinder at which each of the attachment grooves straddles a pair of adjacent cylindrical blocks and so as to be exposed from the outer peripheral surface of the outer cylinder, each of the attachment grooves having a bottom surface that is machined to form a flat surface when the pair of cylindrical blocks are combined. A plurality of positioning blocks are attached to corresponding attachment grooves such that each of the positioning blocks straddles a pair of adjacent cylindrical blocks, the positioning blocks corresponding on a one-to-one basis to the attachment grooves and each having an attachment phase that is uniquely set with respect to a corresponding one of the attachment grooves in the axial direction and in a circumferential direction of the outer cylinder, each of the positioning blocks having an attachment surface corresponding to the bottom surface of a corresponding one of the attachment grooves, the attachment surface being machined so as to form a flat surface. Then, an inner peripheral surface of the outer cylinder is ground in a state in which bottom surfaces of the attachment grooves of pairs of the adjacent cylindrical blocks are fixed to the same plane by using the positioning blocks. As a result, by attaching each of the positioning blocks so as to straddle a pair of adjacent cylindrical blocks, the plurality of cylindrical blocks of the outer cylinder can be assembled such that the states of the inner peripheral surfaces thereof become the same as those when the inner peripheral surface of the outer cylinder was ground. Thus, when reassembling the cylindrical blocks of the outer cylinder after dissembling the cylindrical blocks, the clearances between the cylindrical blocks and the rotating shaft can be made to be the same as those before being disassembled With the main shaft driving apparatus for a machine tool according to the third aspect of the present invention, which includes the rotary joint device according to the first aspect of the present invention, in the case where the main shaft driving apparatus for a machine tool includes a direct drive motor as a driving device for rotating a main shaft, the rotary joint device has the structure described above. Therefore, a load applied to the driving device due to the rotary joint device can be reduced, and thereby many types of fluids can be supplied and drained without increasing the size of the direct drive motor. Because a smaller direct drive motor can be used, the manufacturing cost of the main shaft driving apparatus for a machine tool can be reduced.

DESCRIPTION OF THE PREFERRED EMBODIMENTS

Hereinafter, an embodiment of the present invention will be described with reference to the drawings.

Figure 1:
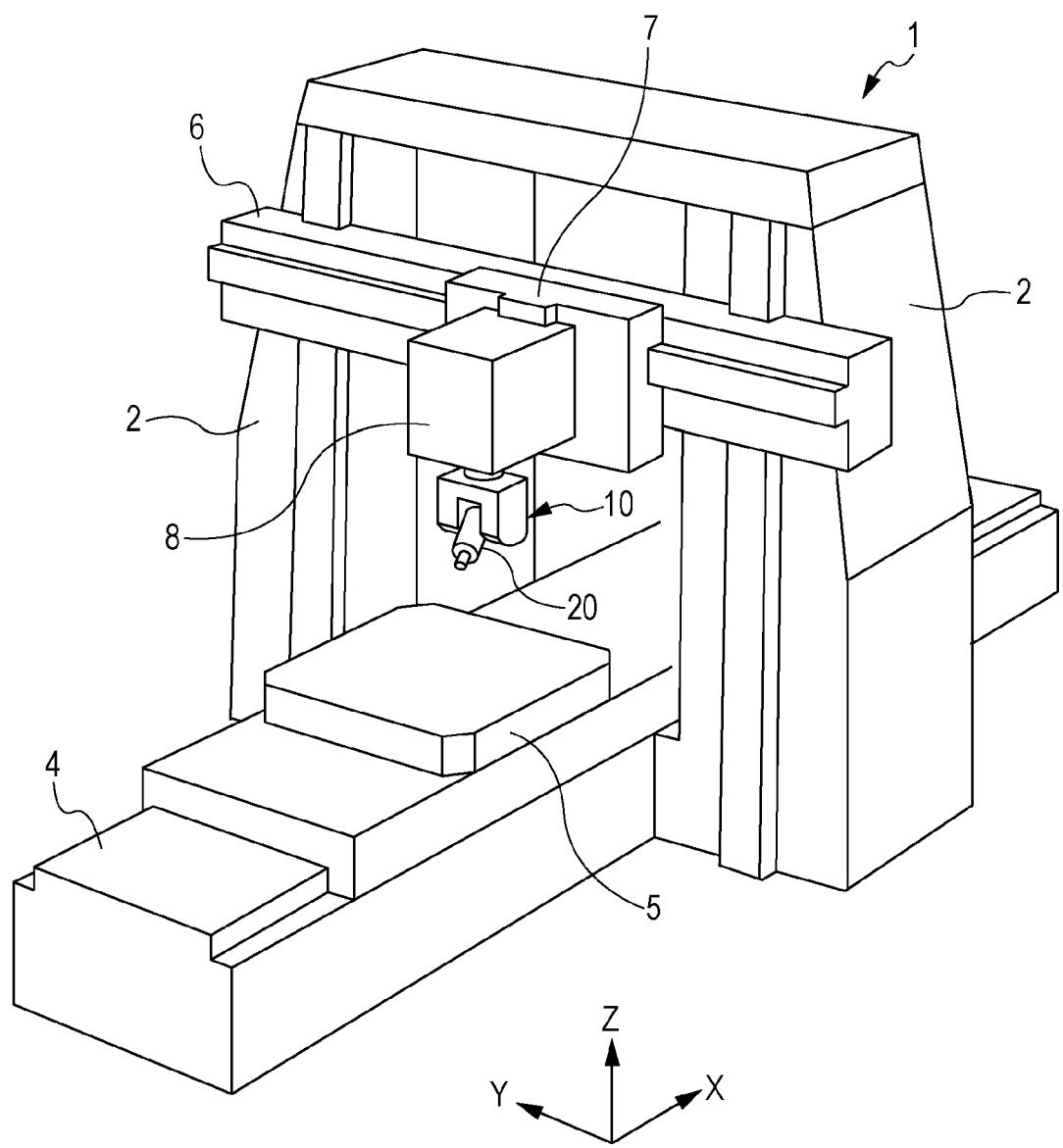
FIG. 1 is a perspective view of an example of a machine tool to which a main shaft driving apparatus including a rotary joint device according to the present invention is applied.

FIGS. 1 to 8 illustrate an embodiment of the present invention. FIG. 1 illustrates a gantry-type machine tool (machining center) 1, which is an example of a machine tool to which a main shaft driving apparatus including a rotary joint device according to the present invention is applied. The gantry-type machine tool 1 includes left and right columns 2 that are mounted on a bed 4, a crossrail 6 that moves along the columns 2 in the up-down directions (the Z-axis directions), a saddle 7 that moves along the crossrail 6 horizontally in the left-right directions (the Y-axis directions), a ram 8 that moves along the saddle 7 in the Z-axis directions, and a table 5 that moves along the bed 4 in the front-back directions (the X-axis directions). In the gantry-type machine tool 1, a machining head 10 is supported by the ram 8 through a C-axis driving apparatus 30. The machining head 10 includes a spindle unit 20 including a spindle 21 to which a tool is attached. The C-axis driving apparatus 30, which corresponds to a main shaft driving apparatus, rotates around a vertical axis (which is parallel to the Z-axis of the machine tool and which will be referred to as the "C-axis") and indexes the angular position of the machining head 10.

Figure 2:
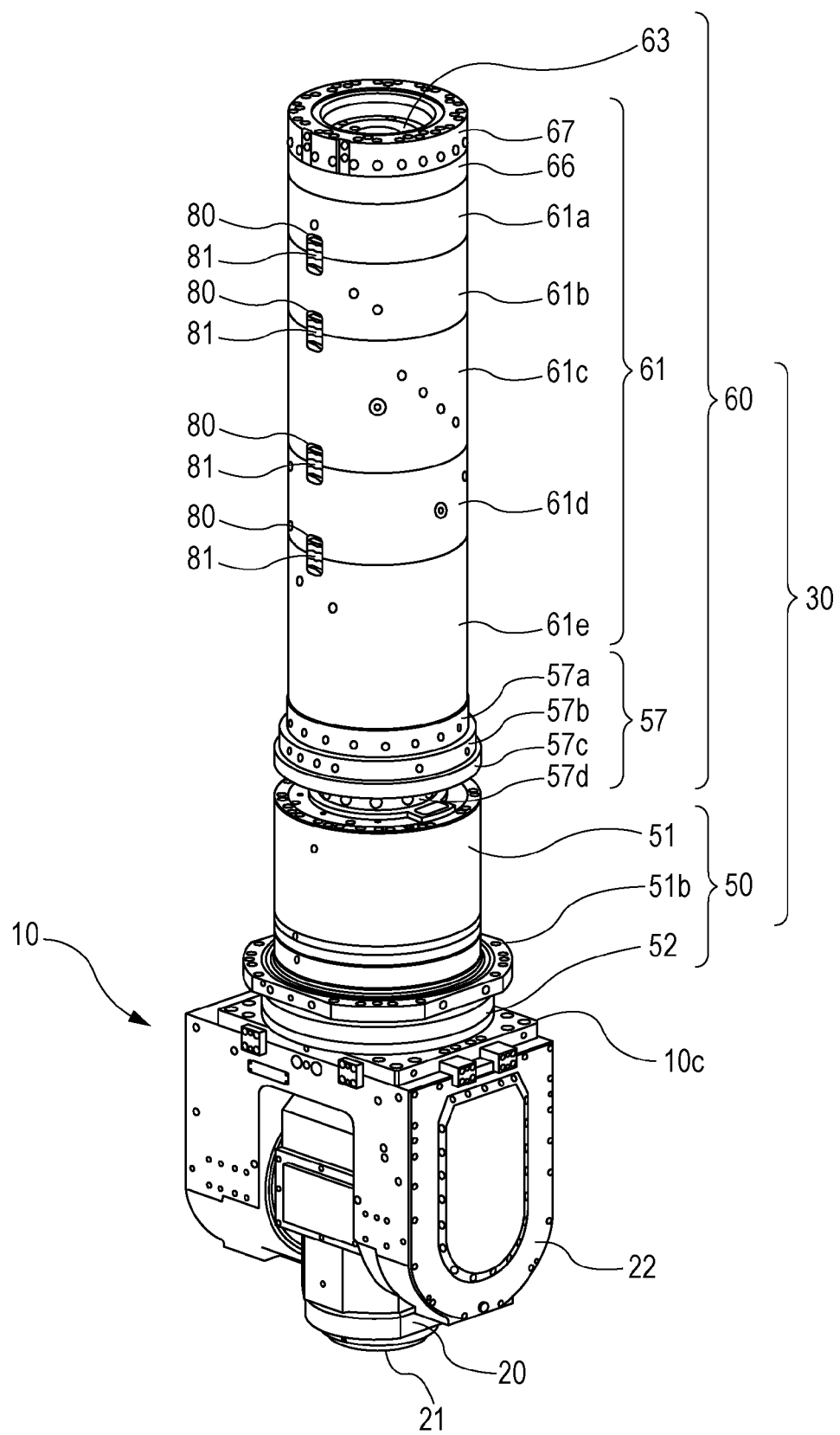
FIG. 2 is a perspective view of the main shaft driving apparatus including the rotary joint device according to the present invention.

As illustrated in FIG. 2, the machining head 10 includes the spindle unit 20, which includes the spindle 21 to which a tool is attached, and a supporting head 22 that supports the spindle unit 20. The machining head 10 includes an indexing mechanism that is built in the supporting head 22 and that indexes the angular position of the spindle unit 20. The spindle unit 20 is a spindle head including a built-in driving motor (not shown) that rotates the spindle 21 at a high speed.

When the gantry-type machine tool 1 machines a workpiece under numerical control based on a preset program, the table 5, the crossrail 6, the saddle 7, and the ram 8 are moved; the C-axis driving apparatus 30 rotates the machining head 10 around the C-axis and indexes the angular position (rotational position) of the machining head 10; and the machining head 10 indexes the angular position (rotational position) of the spindle unit 20. Thus, the machine tool 1 can machine the workpiece by applying a tool to surfaces of the workpiece at an optimum angle, thereby performing cutting or the like of a workpiece having a complex shape.

Figure 3:
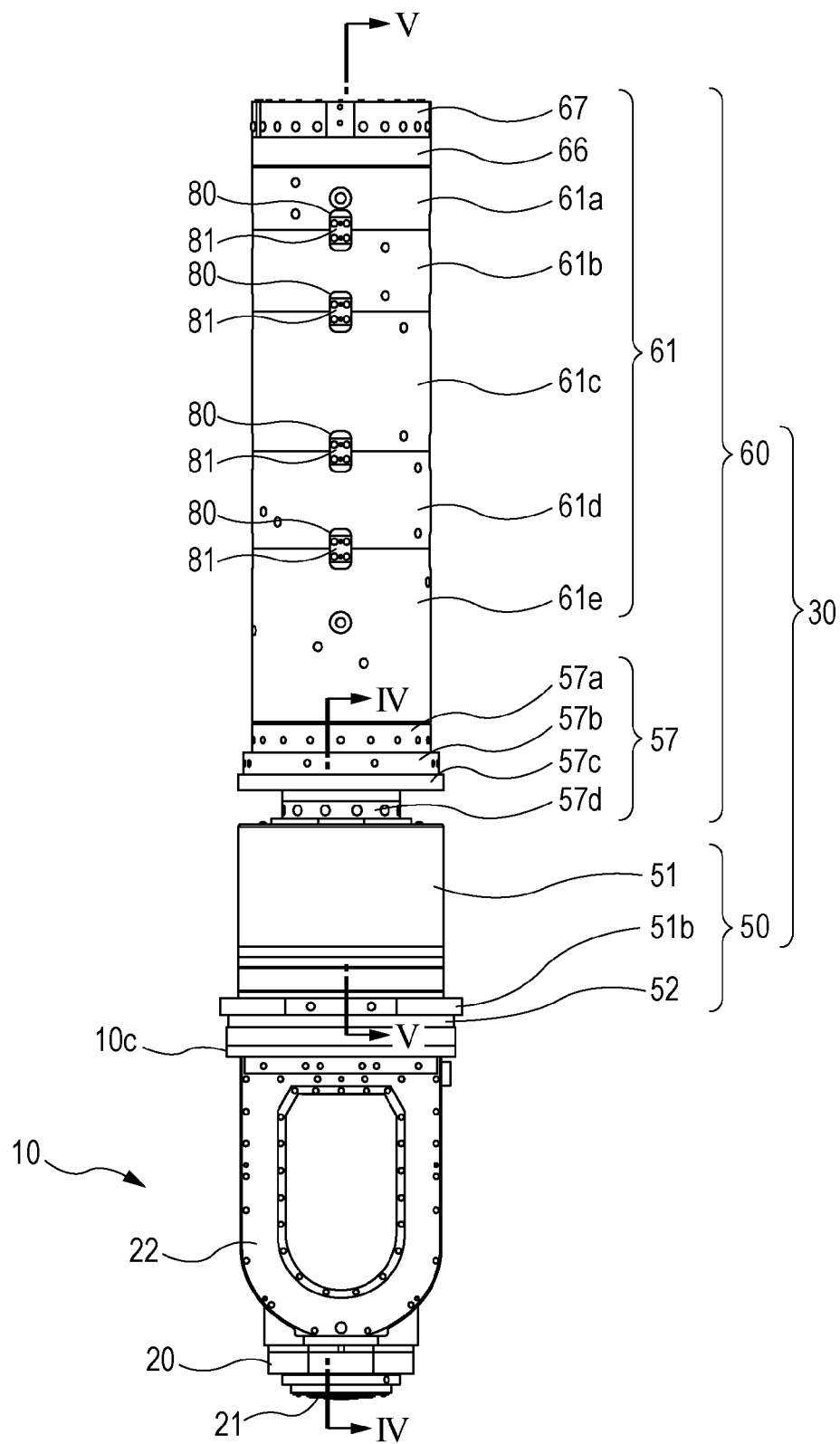
FIG. 3 is a side view of the main shaft driving apparatus including the rotary joint device according to the present invention.

As illustrated in FIGS. 2 and 3, the C-axis driving apparatus 30 includes a rotary head 50 and a rotary joint device 60. The rotary head 50 is connected to the machining head 10 and supports the machining head 10 such that the machining head 10 can rotate around the C-axis. Various fluids are supplied to and drained from the machining head 10 through the rotary joint device 60.

Figure 4:
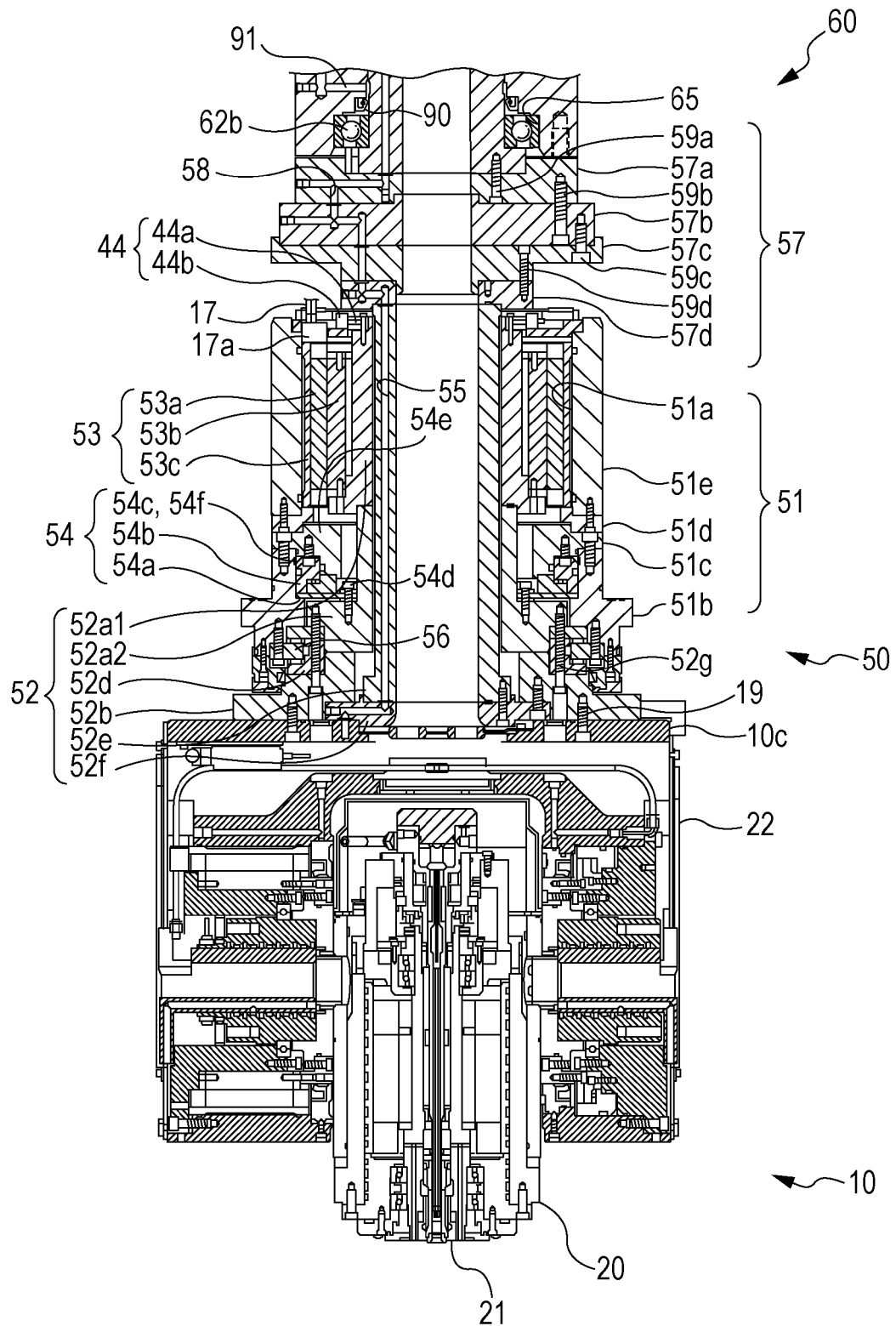
FIG. 4 is a partial front sectional view of the main shaft driving apparatus including the rotary joint device according to the present invention, taken along line IV-IV of FIG. 3.

As illustrated in FIG. 4, the rotary head 50 includes a housing 51 and a main shaft 52. The housing 51 has a through-hole 51a extending therethrough along the C-axis. The main shaft 52 includes shaft members 52a1 and 52a2 disposed in the through-hole 51a. In the example illustrated in the figures, the rotary head 50 is attached to the ram 8 of the gantry-type machine tool 1 with a plurality of screw members that are screwed into a flange portion 51b of the housing 51, the main shaft 52 is attached to the machining head 10, and thereby the machining head 10 is supported by the ram 8.

The rotary head 50 includes an indexing mechanism that indexes the angular position of the main shaft 52 by using a DD motor 53 as driving means. The DD motor 53 is disposed in the through-hole 51a of the housing 51, which corresponds to a frame. The rotary head 50 further includes a clamping device 54 for maintaining the rotational position of the main shaft 52 indexed by the indexing mechanism.

The main shaft 52 includes the shaft members 52a1 and 52a2, a flange member 52b, a main-shaft inner cylinder 52e, and a flange member 52f. The shaft members 52a1 and 52a2 are disposed so as to be rotatable in the through-hole 51a of the housing 51. The flange member 52b is attached to the end of the shaft member 52a2 on the machining head 10 side and extends in radial directions (in directions perpendicular to the C-axis). The rotary joint device 60 described below is connected to the main-shaft inner cylinder 52e. The flange member 52f is attached to the end of the main-shaft inner cylinder 52e on the machining head 10 side and extends in radial directions. Fluid channels 55, through which various fluids are supplied and drained between the rotary joint device 60 described below and the machining head 10, are formed in the main-shaft inner cylinder 52e and the flange member 52f. The shaft member 52a2 is attached to the shaft member 52a1 with a plurality of screw members (not shown) that are arranged in the circumferential direction, and the shaft member 52a2 rotates together with the shaft member 52a1.

The flange member 52b is attached to the shaft member 52a2 with a plurality of screw members 52g that are arranged in the circumferential direction, and the flange member 52b rotates together with the shaft member 52a2. A plurality of screw members 19 that are arranged in the circumferential direction are screwed into the flange member 52b, and a support portion 10c of the machining head 10 is attached to the flange member 52b with the screw members 19. Therefore, the machining head 10 rotates together with the main shaft 52 when the main shaft 52 is rotated by the DD motor 53.

The DD motor 53 includes a motor stator 53a and a motor rotor 53b. The motor stator 53a is fixed to the housing 51 with a stator sleeve 53c therebetween. The motor rotor 53b is disposed so as to face the inner peripheral surface of the motor stator 53a and fixed to the main shaft 52. An excitation current for driving the DD motor 53 is supplied through a cable 17 that is connected to the DD motor 53 via a connector 17a. The motor rotor 53b is fitted and fixed onto an outer peripheral surface of the shaft member 52a1. Therefore, the shaft member 52a1 of the main shaft 52 is rotated around the C-axis when the motor rotor 53b rotates.

In the example illustrated in the figures, a rotation detector 44 is disposed at the upper end of the C-axis driving apparatus 30. The rotation detector 44 detects the rotation amount of the main shaft 52, i.e. the rotation amount of the machining head 10. The rotation detector 44 includes a pair of detection heads 44a and a detection ring 44b. The detection heads 44a are disposed at predetermined positions on the housing 51. The detection ring 44b is disposed so as to face the detection heads 44a and is attached to the shaft member 52a1, which rotates together with the main shaft 52. A detection signal of the rotation detector 44 is sent to the controller of the machine tool and is used to control the rotation of the machining head 10 around the C-axis.

In the example illustrated in the figures, a bearing housing 52*d* is formed between the shaft member 52*a*2 and the flange member 52*b* of the main shaft 52. A bearing 56 is disposed between the bearing housing 52*d* and the housing 51, and the main shaft 52 is supported by the bearing 56 so as to be rotatable relative to the housing 51. In the example illustrated in the figures, the bearing 56 is a triple ring roller bearing (triple roller bearing/axial-radial roller bearing), which is a type of multiple-roller slewing bearing that can bear a high load in the axial and radial directions.

The rotary joint device 60 is connected to the main shaft 52 of the rotary head 50 and joined to an upper part of the rotary head 50. When the C-axis driving apparatus 30 is mounted in the ram 8 of the gantry-type machine tool 1, the rotary joint device 60 is disposed inside the ram 8 and is non-rotatably fixed to the ram 8.

Figure 5:
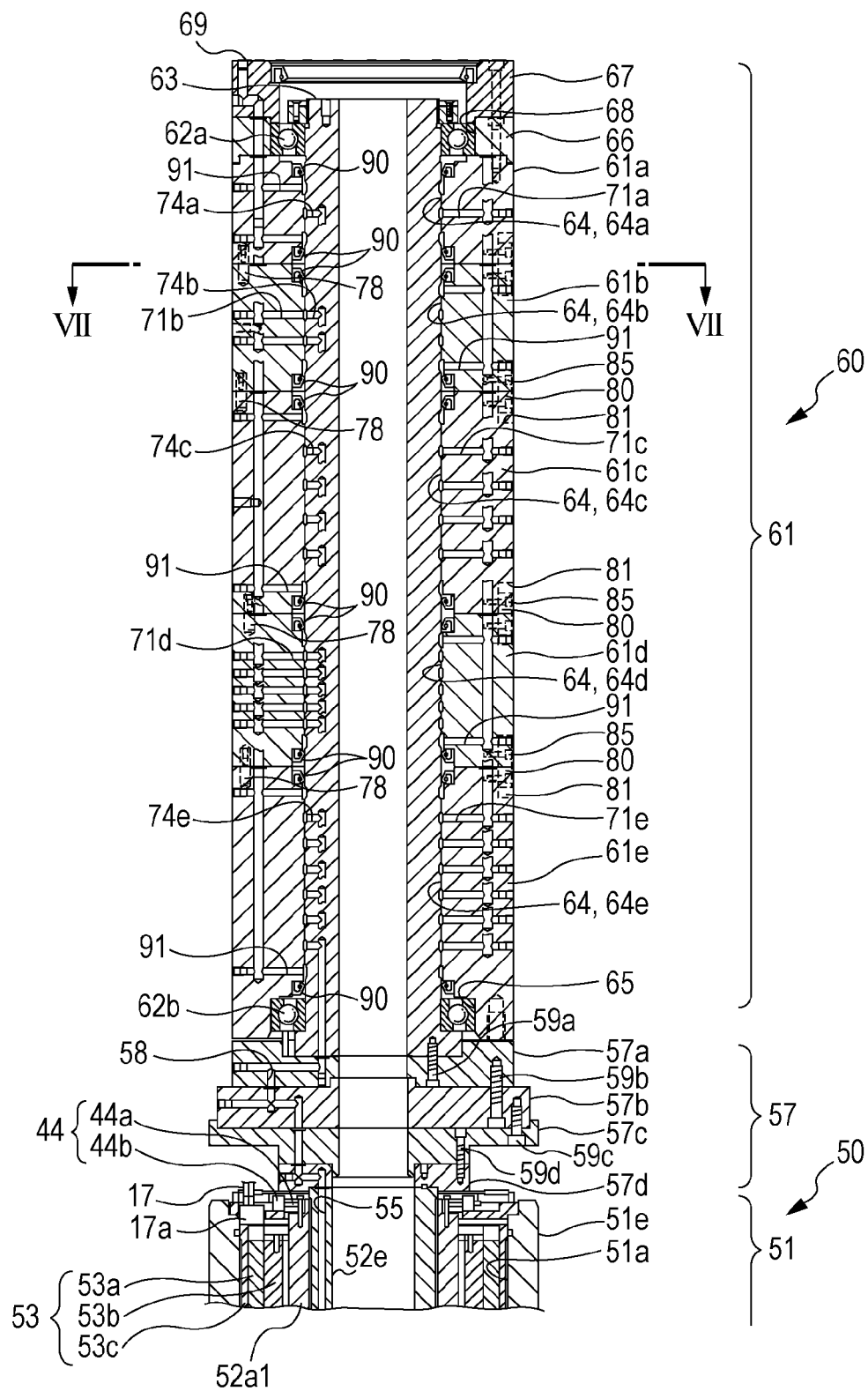
FIG. 5 is a partial front sectional view of the rotary joint device according to the present invention, taken along line V-V of FIG. 3.

As illustrated in FIG. 5, the rotary joint device 60 includes an outer cylinder 61 and a rotating shaft 63. The outer cylinder 61 is non-rotatably fixed to the ram 8 of the gantry-type machine tool 1. The rotating shaft 63 is rotatably supported in the outer cylinder 61 through two bearings 62*a* and 62*b*. In the description below, the term "axial direction" refers to a direction in which the axis of the outer cylinder 61 extends.

In the present embodiment, the main part of the outer cylinder 61 is formed by connecting five cylindrical blocks 61*a*, 61*b*, 61*c*, 61*d*, and 61*e* to each other in the axial direction. Each of the cylindrical blocks 61*a*, 61*b*, 61*c*, 61*d*, and 61*e* is a doughnut-shaped (cylindrical) block having a through-hole. The cylindrical blocks 61*a*, 61*b*, 61*c*, 61*d*, and 61*e* have the same inside diameter and the same outside diameter. In the present embodiment, the outer cylinder 61 is formed by assembling the cylindrical blocks 61*a*, 61*b*, 61*c*, 61*d*, and 61*e* such that the axes of the cylindrical blocks 61*a*, 61*b*, 61*c*, 61*d*, and 61*e* precisely coincide with one another. Moreover, the axes of inner peripheral surfaces 64*a*, 64*b*, 64*c*, 64*d*, and 64*e* of the cylindrical blocks 61*a*, 61*b*, 61*c*, 61*d*, and 61*e*, which form a through-hole 64 in the outer cylinder 61 described below, precisely coincide with the axes of the cylindrical blocks 61*a*, 61*b*, 61*c*, 61*d*, and 61*e*.

Figure 7:
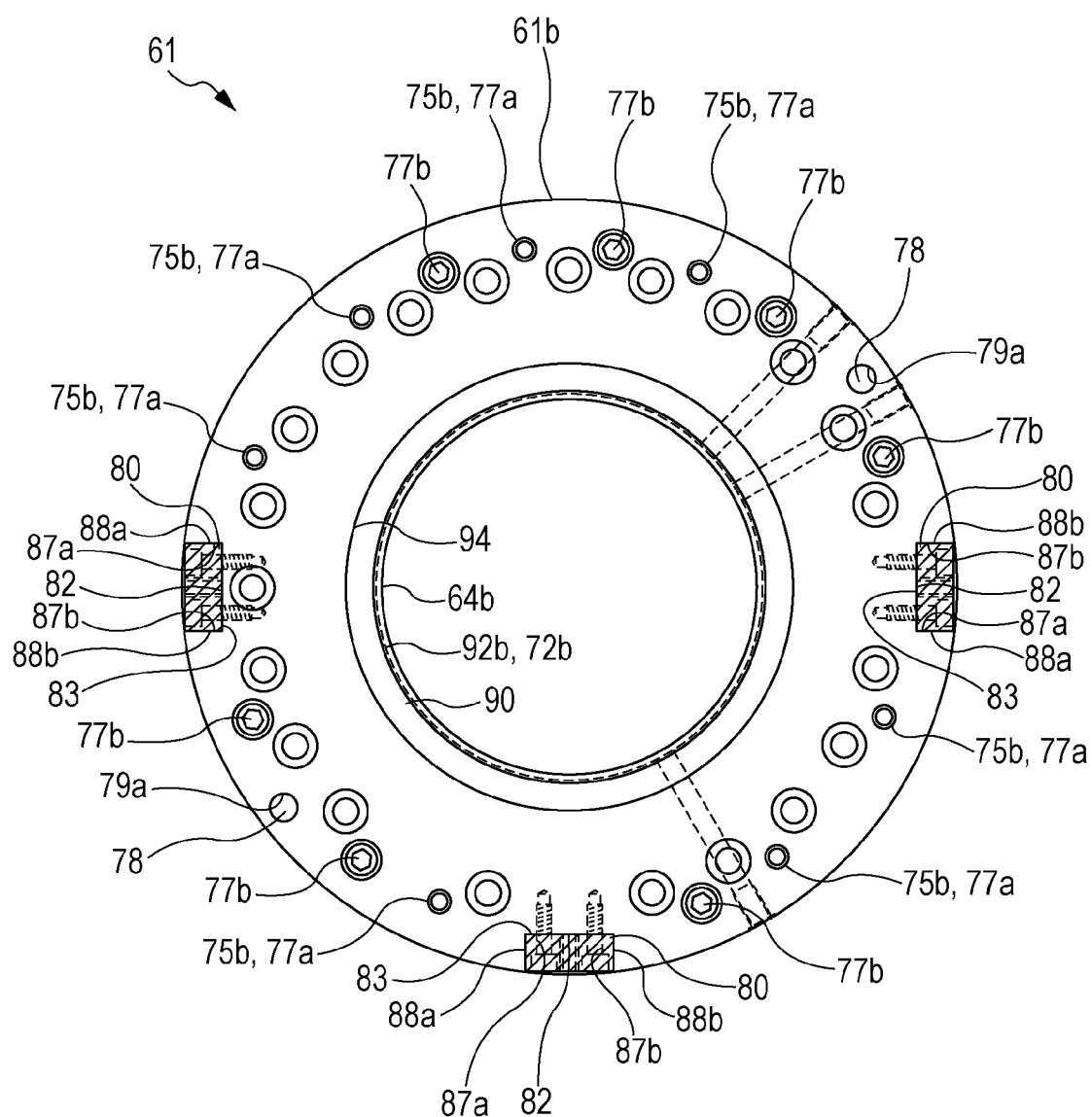
FIG. 7 is a top sectional view of the outer cylinder of the rotary joint device according to the present invention, taken along line VII-VII of FIG. 5.

The cylindrical blocks 61*a*, 61*b*, 61*c*, 61*d*, and 61*e* are connected to each other as described below by taking the connection between the cylindrical blocks 61*a*, 61*b*, and 61*c* as an example. As illustrated in FIG. 7, a plurality of through-holes are formed in the cylindrical block 61*b* so as to be arranged in the circumferential direction around the axis. Screw members 77*b* are inserted into the through-holes from the end surface of the cylindrical block 61*b* on a side opposite to the rotary head 50 side. The cylindrical block 61*b* is attached to the cylindrical block 61*c*, which is located adjacent to the cylindrical block 61*b* on the rotary head 50 side in the axial direction, by screwing the screw members 77*b* into a plurality of screw holes (not shown) formed in the cylindrical block 61*c*. A plurality of screw holes 75*b* are formed in the end surface of the cylindrical block 61*b* on a side opposite to the rotary head 50 side such that the screw holes 75*b* are arranged in the circumferential direction with a phase that is shifted relative to the phase of the through holes described above. As with the cylindrical block 61*b*, a plurality of through-holes are formed in the cylindrical block 61*a*, which is located adjacent to the cylindrical block 61*b* on a side opposite to the rotary head 50 side in the axial direction. The cylindrical block 61*b* is attached to the cylindrical block 61*a* by screwing a plurality of screw members 77*a*, which are inserted through the through holes, into the screw holes 75*b*.

That is, each pair of the cylindrical blocks 61*a*, 61*b*, 61*c*, 61*d*, and 61*e* of the outer cylinder 61 that are adjacent to each other in the axial direction are attached to each other as follows: a plurality of through holes are formed in one of each pair of adjacent cylindrical blocks that is disposed on a side opposite to the rotary head 50 side in the axial direction; and threaded portions of screw members that are inserted through the through holes are screwed into screw holes that are formed in the end surface of the other of the pair of adjacent cylindrical blocks.

Figure 6:
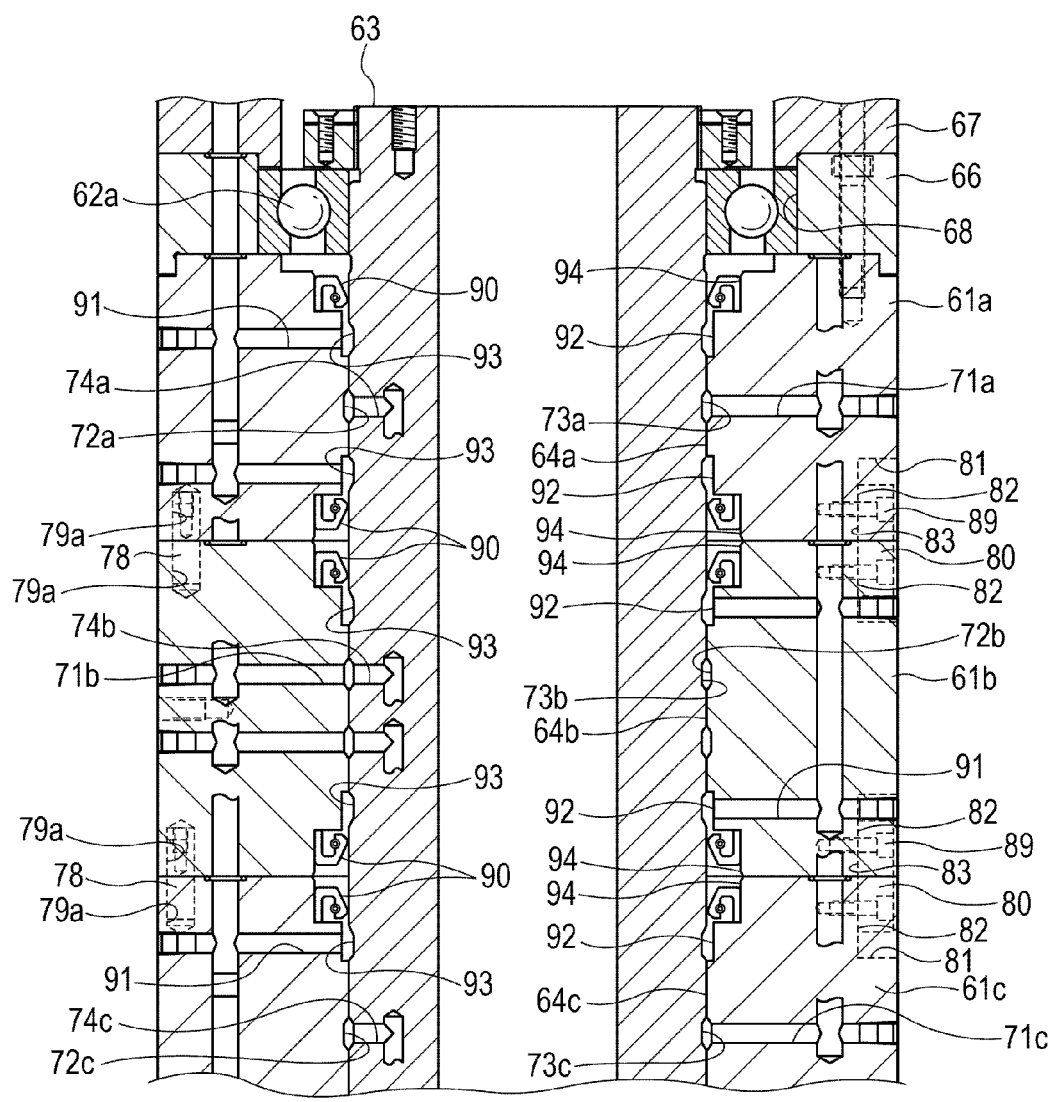
FIG. 6 is an enlarged partial front sectional view of an outer cylinder of the rotary joint device according to the present invention.

In the example illustrated in the figures, a plurality of (in the example, two) positioning pins 78 are provided for each pair of adjacent cylindrical blocks. To be specific, as illustrated in FIGS. 6 and 7 by taking the cylindrical block 61*b* as an example, a pair of attachment holes 79*a* are formed in adjacent end surfaces of each pair of adjacent cylindrical blocks 61*a*, 61*b*, 61*c*, 61*d*, and 61*e* such that the phase of the attachment holes formed in the pair of adjacent cylindrical blocks coincide with each other. By fitting the positioning pins 78 into the attachment holes 79*a* formed in each pair of adjacent cylindrical blocks, the pair of adjacent cylindrical blocks are connected to each other such that the phases thereof in the circumferential direction coincide with each other.

As illustrated in FIG. 5, the outer cylinder 61 has the through-hole 64, which is constituted by through holes formed in the cylindrical blocks 61*a*, 61*b*, 61*c*, 61*d*, and 61*e*. That is, the through-hole 64 is defined by the inner peripheral surfaces 64*a*, 64*b*, 64*c*, 64*d*, and 64*e* of the cylindrical blocks 61*a*, 61*b*, 61*c*, 61*d*, and 61*e*. The outer cylinder 61 that is integrally formed includes two bearing attachment portions that are located at both ends of the through-hole 64 so as to be away from each other in the axial direction. The two bearings 62*a* and 62*b* are disposed in the two bearing attachment portions.

To be specific, the outer cylinder 61 includes a cylindrical member 66 and a cylindrical member 67. In the outer cylinder 61, the cylindrical block 61*a* is located farthest from the rotary head 50, and the cylindrical member 66 is attached to the end surface of the cylindrical block 61*a* on a side opposite to the rotary head 50 side. The cylindrical member 66 has a through-hole 68 having a diameter larger than that of the inner peripheral surface 64*a* of the cylindrical block 61*a*. The cylindrical member 67, which is used to press a bearing, is attached to the end surface of the cylindrical member 66 on a side opposite to the rotary head 50 side. The cylindrical member 67 has a through-hole having a diameter smaller than that of the through-hole 68 formed in the cylindrical member 66. The bearing 62*a* is disposed so that the outer peripheral surface of the outer race thereof is fitted to the inner peripheral surface of the through-hole 68. Therefore, the through-hole 68 in the cylindrical member 66 serves as a bearing attachment portion on one side. The position of the bearing 62*a* in the axial direction is restricted by the end surface of the cylindrical block 61*a* on a side opposite to the rotary head 50 side and the end surface of the cylindrical member 67 on the rotary head 50 side. The inner peripheral surface of the inner race of the bearing 62*a* defines a part of the through-hole 64 in the outer cylinder 61.

In the outer cylinder 61, the cylindrical block 61*e* is located nearest to the rotary head 50. A step portion 65 is formed in an end portion of the cylindrical block 61*e* on the rotary head 50 side such that a part of the inner peripheral surface 64*e*, which defines a part of the through-hole 64, has a larger diameter. The bearing 62*b* is disposed such that the outer peripheral surface of the outer race thereof is fitted to the inner peripheral surface of the step portion 65. Therefore, the step portion 65 functions as a bearing attachment portion on the other side. The position of the bearing 62b in the axial direction is restricted by the end surface of the cylindrical block 61e on the rotary head 50 side, which forms the step portion 65 and by the rotating shaft 63 described below.

In the example illustrated in the figures, regarding the structure with which the cylindrical member 66 is attached to the cylindrical block 61a, the cylindrical block 61a includes a step portion formed by reducing the diameter of a part of the outer peripheral surface at the end thereof on the rotary head 50 side. The cylindrical member 66 has a circular protruding portion formed by making an outer peripheral portion of the end surface thereof on the rotary head 50 side protrude toward the rotary head 50. The cylindrical member 66 is positioned relative to the cylindrical block 61a by fitting the protruding portion into the step portion.

In the example illustrated in the figures, the cylindrical block 61a and the cylindrical member 66 have substantially the same outside diameter. The through-hole 68 in the cylindrical member 66 and the inner peripheral surface of the protruding portion are formed such that the axes thereof coincide with the axis of the cylindrical member 66. The outer peripheral surface of the step portion of the cylindrical block 61a is formed such that the axis thereof coincides with the axis of the cylindrical block 61a. Therefore, when the cylindrical member 66 is attached to the cylindrical block 61a by fitting the protruding portion of the cylindrical member 66 into the step portion of the cylindrical block 61a, the cylindrical member 66 is attached to the cylindrical block 61a such that the axes thereof coincide with each other. As a result, the axis of the through-hole 68 coincides with the axis of the cylindrical block 61a. Thus, when the bearing 62a is fitted into the through-hole 68 in the cylindrical member 66, the axis of the inner peripheral surface of the inner race of the bearing 62a coincides with the axis of the cylindrical block 61a.

The inner peripheral surface of the step portion 65, which serves as a bearing attachment portion on the other side, is formed in the cylindrical block 61e such that the axis thereof coincides with the axis of the cylindrical block 61e. Therefore, when the bearing 62b is fitted into the step portion in the cylindrical block 61e, the axis of the inner peripheral surface of the inner race of the bearing 62b coincides with the axis of the cylindrical block 61e.

The bearings 62a and 62b are angular contact ball bearings having a structure that prevents displacement of the shaft axis. The bearings 62a and 62b are disposed in the outer cylinder 61 such that the outer peripheral surfaces thereof are fitted to the step portion 65 and the through-hole 68.

The rotating shaft 63 is a cylindrical member that is fitted into the through-hole 64 in the outer cylinder 61. The rotating shaft 63 is disposed in the through-hole 64 in the outer cylinder 61 so as to be coaxial with the C-axis. To be specific, the outer peripheral surface of the rotating shaft 63 includes two bearing portions that are located away from each other in the axial direction. When the bearing portions are fitted to the inner peripheral surfaces the inner races of the bearings 62a and 62b, which are disposed on the bearing attachment portions of the outer cylinder 61 described above, the rotating shaft 63 is disposed in the through-hole 64 so as to be coaxial with the through-hole 64 with respect to the C-axis and is rotatably supported in the through-hole 64. Therefore, the rotating shaft 63 is disposed such that the entirety of the outer peripheral surface thereof faces the inner peripheral surface of the through-hole 64 with a predetermined distance therebetween.

The rotating shaft 63 includes a flange portion at the end thereof on the rotary head 50 side. The flange portion restricts the position of the bearing 62b, which is fitted to the step portion of the cylindrical block 61e, in the axial direction. A flange body 57 having a disk-like shape is attached to the rotating shaft 63 by being fitted into the flange portion.

The flange body 57 is formed by coaxially combining flange members 57a, 57b, 57c, and 57d having disk-like shapes. The flange body 57 is attached to the rotating shaft 63 by screwing a plurality of screw members 59a, which are inserted into the flange member 57a at circumferential positions surrounding the axis thereof, into the rotating shaft 63 from the end surface of the flange member 57a on the rotary head 50 side in the axial direction. The flange member 57d of the flange body 57 is attached to the main-shaft inner cylinder 52e of the rotary head 50 with a plurality of screw members (not shown). Therefore, the rotating shaft 63 of the rotary joint device 60 and the main shaft of the rotary head 50 are connected to each other through the flange body 57.

Moreover, the flange body 57 is attached to the rotating shaft 63 such that the axes thereof coincide with each other, and the flange body 57 is attached to the main shaft 52 of the rotary head 50 so that the axes thereof coincide with each other. Therefore, the rotary joint device 60 is attached to the rotary head 50 such that the axis of the rotating shaft 63 coincides with the axis of the main shaft 52. To be specific, the flange body 57, the rotating shaft 63, and the main shaft 52 are attached to one another as described below.

The flange member 57a of the flange body 57, which is located nearest to the rotating shaft 63 (farthest from the rotary head 50), includes a circular protruding portion that is formed by making a part of an outer peripheral portion of the end surface thereof on a side opposite to the rotary head 50 side protrude in a direction away from the rotary head 50. The diameter of an inner peripheral surface of the protruding portion substantially coincides with the outside diameter of the flange portion of the rotating shaft 63. The flange body 57 is positioned relative to the rotating shaft 63 by fitting the protruding portion of the flange member 57a to the flange portion of the rotating shaft 63. In this structure, the flange portion of the rotating shaft 63 has a disk-like shape that is centered on the axis of the rotating shaft 63. The protruding portion of the flange member 57a is formed such that the axis of the inner peripheral surface thereof coincides with the axis of the flange body 57. Therefore, when the flange portion of the rotating shaft 63 is fitted to the protruding portion of the flange member 57a, the flange body 57 is attached to the rotating shaft 63 such that the axes thereof coincide with each other.

The flange member 57d of the flange body 57, which is positioned nearest to the rotary head 50, includes a circular protruding portion that is formed by making a part of an outer peripheral portion of the end surface of the flange member 57d on the rotary head 50 side protrude toward the rotary head 50. The flange body 57 is positioned relative to the main shaft 52 by fitting the inner peripheral surface of the protruding portion of the flange member 57d to an end portion of the outer peripheral surface of the main-shaft inner cylinder 52e of the main shaft 52 of the rotary head 50. In this structure, the protruding portion of the flange member 57d is formed such that the axis of the inner peripheral surface thereof coincides with the axis of the flange body 57. Therefore, when the protruding portion of the flange member 57d is fitted to the main-shaft inner cylinder 52e, the flange body 57 is attached to the main shaft 52 of the rotary head 50 such that the axes thereof coincide with each other.

Fluid channels 58, through which various fluids are supplied and drained between the rotary joint device 60 and the rotary head 50, are formed in the flange members 57a, 57b, 57c, and 57d of the flange body 57.

A plurality of ports 69 are formed in the end surface of the outer cylinder 61 on a side opposite to the rotary head 50 side so as to be displaced from each other in the circumferential direction. Fluids are introduced from the outside (from the machine tool side) through the ports 69 and drained to the outside through the ports 69. A plurality of fluid channels, which communicate with the plurality of ports 69, are formed in the outer cylinder 61. A plurality of fluid channels, which correspond to the fluid channels in the outer cylinder 61, are formed in the rotating shaft 63 so as to be displaced from each other in the circumferential direction. The fluid channels in the outer cylinder 61 and the corresponding fluid channels in the rotating shaft 63 communicate with each other through annular connection grooves formed in both of the facing surfaces of the outer cylinder 61 and the rotating shaft 63, so that communication between the fluid channels is maintained while the rotating shaft 63 rotates. The plurality of fluid channels formed in the rotating shaft 63 communicate with a rotary joint device (not shown) of the machining head 10 through the fluid channels 55 and 58. Therefore, fluids that are supplied from the outside to the ports 69 in the outer cylinder 61 of the rotary joint device 60 are supplied to the rotary joint device of the machining head 10 through the rotating shaft 63.

To be specific, the plurality of fluid channels in the outer cylinder 61 are formed as fluid channels 71a, 71b, 71c, 71d, and 71e in the cylindrical blocks 61a, 61b, 61c, 61d, and 61e, respectively. At least one of each of the fluid channels 71a, 71b, 71c, 71d, and 71e is formed in the cylindrical blocks 61a, 61b, 61c, 61d, and 61e, respectively. The fluid channels 71a, 71b, 71c, 71d, and 71e communicate with connection grooves 72a, 72b, 72c, 72d, and 72e formed in the inner peripheral surfaces 64a, 64b, 64c, 64d, and 64e of the cylindrical blocks 61a, 61b, 61c, 61d, and 61e, respectively. The connection grooves 72a, 72b, 72c, 72d, and 72e, which are formed in the inner peripheral surfaces 64a, 64b, 64c, 64d, and 64e of the cylindrical blocks 61a, 61b, 61c, 61d, and 61e, are annular grooves that are open toward the rotating shaft 63 and that extend in the circumferential direction.

A plurality of connection grooves 73a, 73b, 73c, 73d, and 73e are formed in the outer peripheral surface of the rotating shaft 63 so as to correspond to the connection grooves 72a, 72b, 72c, 72d, and 72e in the cylindrical blocks 61a, 61b, 61c, 61d, and 61e. The connection grooves 73a, 73b, 73c, 73d, and 73e, which are formed in the outer peripheral surface of the rotating shaft 63, are annular grooves that are open toward the outer cylinder 61 and that extend in the circumferential direction. The connection grooves 73a, 73b, 73c, 73d, and 73e communicate with fluid channels 74a, 74b, 74c, 74d, and 74e that are formed in the rotating shaft 63 so as to correspond to the fluid channels 71a, 71b, 71c, 71d, and 71e in the outer cylinder 61. Therefore, the fluid channels 71a, 71b, 71c, 71d, and 71e in the outer cylinder 61 and the corresponding fluid channels 74a, 74b, 74c, 74d, and 74e in the rotating shaft 63 communicate with each other through the connection grooves 72a, 72b, 72c, 72d, and 72e, which are formed in the cylindrical blocks 61a, 61b, 61c, 61d, and 61e, and through the connection grooves 73a, 73b, 73c, 73d, and 73e, which are formed in the rotating shaft 63, so that communication between the fluid channels is maintained while the rotating shaft 63 rotates.

The rotary joint device 60 is an outer-cylinder-connected-type rotary joint device having the basic structure described above. In the present embodiment, as can be seen from the figures, a so-called squeeze packing such as an O-ring or the like is not disposed on the facing surfaces of the outer cylinder 61 and the rotating shaft 63 in order to reduce a load applied to the DD motor 53, which corresponds to a driving device.

However, when a squeeze packing is not used as described above, the pressure of a fluid on the supply side decreases because leakage occurs between a fluid channel in the outer cylinder 61 and a fluid channel in the rotating shaft 63. To prevent this, a rotary joint device according to the present invention is configured such that the diametrical clearance between the outer cylinder 61 and the rotating shaft 63 is made as small as possible in order to limit such decrease in the pressure of the fluid to an allowable level. To be specific, the diametrical clearance between the facing surfaces of the outer cylinder 61 and the rotating shaft 63 is set equal to or smaller than 0.005 mm and thereby each port is made nearly liquid-tight or nearly airtight.

In the present embodiment, the rotary joint device 60 has no squeeze packing. However, this is not necessarily the case. At least one squeeze packing may be disposed between the facing surfaces of the outer cylinder 61 and the rotating shaft 63 so as to correspond to at least one of the fluid channels in the outer cylinder 61. For example, for a fluid channel through which a high pressure fluid is supplied, O-rings that serve as squeeze packings may be disposed on both sides, in the axial direction, of the connection grooves that communicate with the fluid channel in order to prevent leakage of the fluid from both sides of the connection groove. However, when using a plurality of squeeze packings, it is necessary that a load applied to the DD motor 53, which drives the main shaft 52 of the rotary head 50, be in a range that is allowable for the DD motor 53.

In the rotary joint device 60 illustrated in the figures, a plurality of oil seals 90, a plurality of drain channels 91, and a plurality of drain grooves 92 and 93 are provided as structures for recovering various fluids that have leaked through the diametrical clearance between the facing surfaces of the outer cylinder 61 and the rotating shaft 63.

In this structure, the oil seals 90 are general low-pressure contact seals and disposed at both ends of each of the cylindrical blocks 61a, 61b, 61c, 61d, and 61e in the axial direction. To be specific, each of the cylindrical blocks 61a, 61b, 61c, 61d, and 61e includes step portions 94 that are formed by enlarging the inside diameters of both end portions, in the axial direction, of a corresponding one of the inner peripheral surfaces 64a, 64b, 64c, 64d, and 64e. The oil seals 90 are disposed in the step portions 94 such that the outer peripheral surfaces thereof are fitted into the step portions 94. The inner peripheral surfaces of the oil seals 90 are in slidable contact with the outer peripheral surface of the rotating shaft 63, so that the oil seals 90 prevent fluids that have leaked through the diametrical clearance from flowing beyond the ends of each of the cylindrical blocks 61a, 61b, 61c, 61d, and 61e in the axial direction. However, the oil seals 90 only function to suppress small leakage of fluid through the diametrical clearance between the facing surfaces of the outer cylinder 61 and the rotating shaft 63. Therefore, friction caused by the oil seals 90 is considerably lower than that caused by the squeeze packings described above. Therefore, only a small load is applied to the DD motor 53, which drives the main shaft 52 of the rotary head 50 connected to the rotating shaft 63.

The drain grooves 92 are annular grooves formed in the inner peripheral surfaces 64a, 64b, 64c, 64d, and 64e of the cylindrical blocks 61a, 61b, 61c, 61d, and 61e. The drain grooves 92 are open toward the rotating shaft 63 and extend in the circumferential direction. In the example illustrated in the figures, the drain grooves 92 are formed in each of the cylindrical blocks 61*a*, 61*b*, 61*c*, 61*d*, and 61*e* at two positions each between the oil seal 90 and the connection groove in the axial direction. In the example illustrated in the figures, the drain grooves 92 are not formed between the connection grooves. A plurality of drain grooves 93 are formed in the outer peripheral surface of the rotating shaft 63 so as to correspond to the drain grooves 92. The drain grooves 93 are annular grooves that extend in the circumferential direction and that are open toward the cylindrical blocks 61*a*, 61*b*, 61*c*, 61*d*, and 61*e*, in which corresponding drain grooves 92 are formed. The drain grooves 93 are formed at positions, with respect to the axial direction, at which the drain grooves 93 face the drain grooves 92. Drain channels 91 are formed in the cylindrical blocks 61*a*, 61*b*, 61*c*, 61*d*, and 61*e* so as to correspond to the drain grooves 92. The drain channels 91 communicate with the drain grooves 92 through the inner peripheral sides thereof. Each of the drain channels 91 communicates with a port (not shown) formed at an end of the outer cylinder 61 and communicates with an external apparatus (for example, a recovery tank) through the port.

In the rotary joint device 60 described above, each of the cylindrical blocks 61*a*, 61*b*, 61*c*, 61*d*, and 61*e* of the outer cylinder 61 is joined to the adjacent one of the cylindrical blocks such that the phases thereof coincide with each other by using the positioning pins 78 that are inserted into an end surface thereof. In this state, each pair of adjacent cylindrical blocks are connected and fixed to each other by screwing screw members that are inserted into one of the pair of cylindrical blocks into the other of the pair of cylindrical blocks. However, with only such a connection structure, the state of assembly of the cylindrical blocks 61*a*, 61*b*, 61*c*, 61*d*, and 61*e* of the outer cylinder 61 cannot necessarily be made to be a state of assembly with high precision (in the case of the present embodiment, a state of assembly in which the cylindrical blocks 61*a*, 61*b*, 61*c*, 61*d*, and 61*e* are assembled such that the axes thereof coincide with one another with high precision). Therefore, when reassembling the outer cylinder 61 after temporarily disassembling the outer cylinder 61, the state of assembly (to be specific, the diametrical clearances between the cylindrical blocks and the rotating shaft 63) cannot be restored the original state (that substantially coincides with the state before disassembling) with high precision. The reason for this is as follows.

First, the positioning pins 78 are provided only for aligning the phases of adjacent cylindrical blocks with each other and thereby making a plurality of fluid channels correspond to and communicate with each other. Therefore, the positioning pins 78 are not provided for making the state of assembly of the cylindrical blocks 61*a*, 61*b*, 61*c*, 61*d*, and 61*e* to be a state of assembly with such high precision as described above. This is because, to realize the state of assembly with such high precision as described above by using the positioning pins 78, it is necessary to reduce the clearances between the positioning pins 78 and the attachment holes 79*a*. However, when the clearances between the positioning pins 78 and the attachment holes 79*a* are reduced, it becomes difficult to extract the positioning pins 78 from the attachment holes 79*a* when disassembling the outer cylinder 61 and thereby workability is considerably impaired. In the worst case, disassembling itself may become impossible. Therefore, it is necessary that there be certain clearances between the positioning pins 78 and the attachment holes 79*a*. As a result, it is difficult to use the positioning pins 78 for the purpose of realizing a state of assembly with such high precision as described above.

A similar argument applies to the screw members, because the screw members are only used to connect adjacent cylindrical blocks to each other with fastening forces that act in the axial direction. To be specific, the screw members are inserted into through holes formed in one of a pair of adjacent cylindrical blocks and screwed into screw holes formed in the other of the pair of cylindrical blocks. The clearances (gaps) between the screw members and the through-holes are larger than those between the positioning pins 78 and the attachment holes 79*a*. The reason for this is as follows. The precision of female threading of a screw hole or the like, with respect to the positioning dimension and the diametrical dimension, is lower than the precision of hole drilling (for example, drilling of the attachment holes 79*a*, into which the positioning pins 78 are fitted). Moreover, the precision of male threading of a screw member or the like with respect to the diametrical dimension is lower than that of forming the positioning pin 78 because male threading is generally performed through a rolling process. In order to allow such lower precision, it is necessary that the clearances (gaps) between the screw members and the through-holes be larger than those between the positioning pins 78 and the attachment holes 79*a*. Therefore, the state of assembly of the cylindrical blocks 61*a*, 61*b*, 61*c*, 61*d*, and 61*e* of the outer cylinder 61 cannot be made to be a state of assembly with such high precision as described above by using the screw members.

To restore the state of assembly of the cylindrical blocks 61*a*, 61*b*, 61*c*, 61*d*, and 61*e* of the outer cylinder 61 with high precision, the rotary joint device 60 according to the present invention includes a plurality of attachment grooves 81 formed in the outer cylinder 61 and a plurality of positioning blocks 80 attached to the attachment grooves 81.

Figure 8:
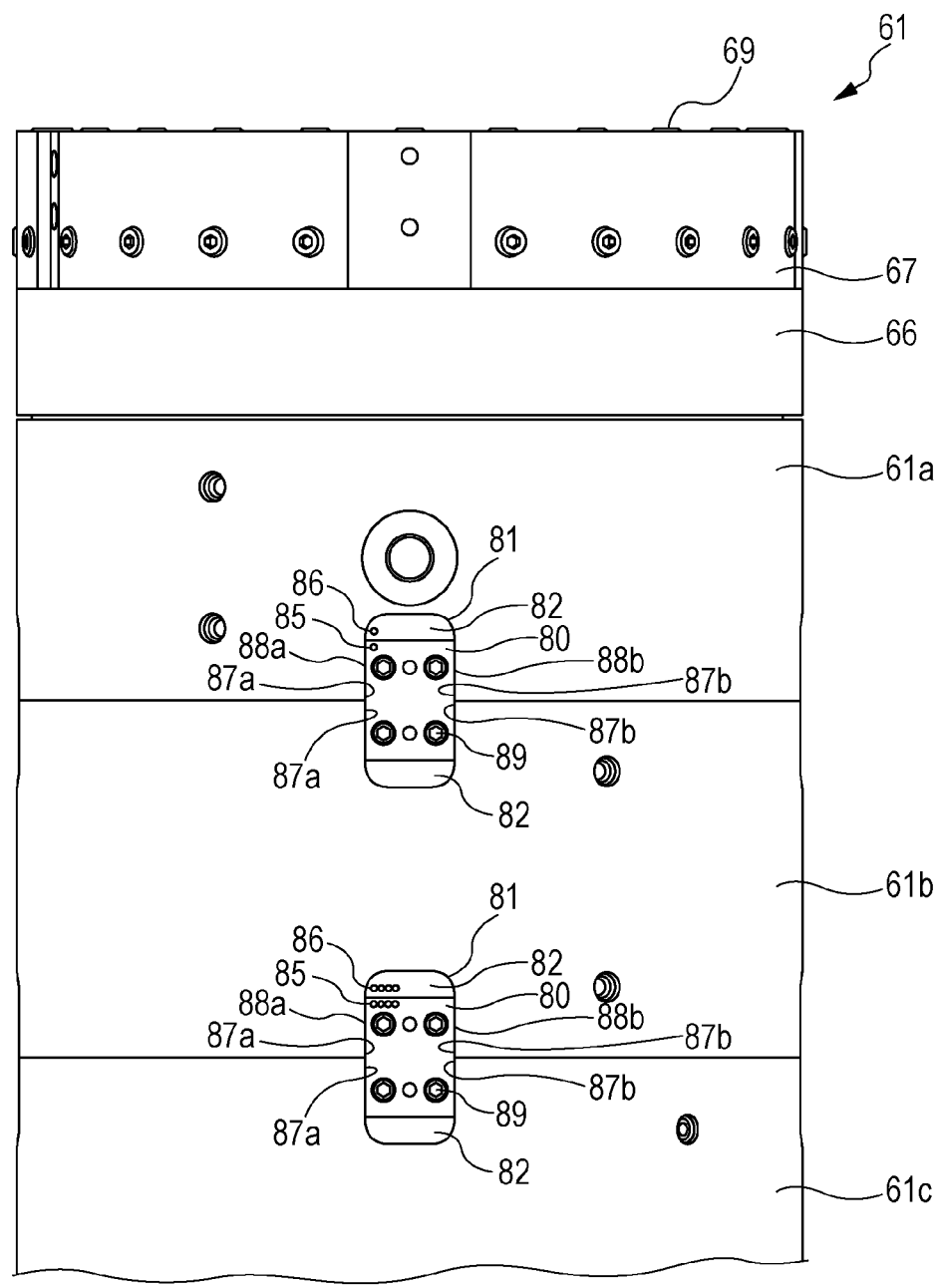
FIG. 8 is an enlarged partial side view of the outer cylinder of the rotary joint device according to the present invention.

As illustrated in FIG. 8, the attachment grooves 81 are formed in the outer peripheral surface of the outer cylinder 61 so as to straddle each pair of adjacent cylindrical blocks and so as to be exposed to the outside. A bottom surface 82 of the attachment groove 81 is machined to form a flat surface in a state in which the pair of adjacent cylindrical blocks are combined. Referring to FIG. 7, in the example illustrated in the figures, the attachment grooves 81 are formed at three positions on the outer periphery of the outer cylinder 61 such that the phases thereof are shifted from each other by 90 degrees for each pair of adjacent cylindrical blocks. Thus, the axes of the pair of adjacent cylindrical blocks can be aligned with each other with respect to two or more different directions perpendicular to the axis of the outer cylinder 61 at two or more positions on the outer periphery of the outer cylinder 61.

Each of the positioning blocks 80, which is attached to corresponding one of the attachment grooves 81, is a substantially rectangular-parallelepiped-shaped metal block. The positioning block 80 has an attachment surface 83 that is machined to form as a flat surface corresponding to the bottom surface 82 of the attachment groove 81. Each of the positioning blocks 80 is attached to a corresponding one of the attachment grooves 81 with four attachment bolts 89 that extend through the positioning block 80 and that are screwed into screw holes that are formed so as to have openings in the bottom surface 82 of the attachment groove 81.

In the example illustrated in the figures, in order to prevent the positioning block 80 from being caught on an internal part of the ram 8 when installing the rotary joint device 60 in the ram 8, the depth of each of the attachment grooves 81 in the radial direction of the outer cylinder 61 is made larger than the thickness of the positioning block 80 attached to the attachment groove 81. Therefore, the positioning blocks 80 are attached to the attachment groove 81 such that the positioning blocks 80 are embedded in the outer peripheral surface of the outer cylinder 61.

The bottom surfaces 82 of the attachment grooves 81 are machined in the same manner to form flat surfaces that are substantially the same. However, in reality, the surface conditions (finish) of the bottom surfaces 82 vary within the tolerance of surface roughness. The same applies to the attachment surfaces 83 of the positioning blocks 80. In particular, finish of the bottom surfaces 82 of the attachment grooves 81 is performed through a cutting process because it is necessary to form a flat surface inside the attachment groove 81, and variance in the cutting process causes the difference in the surface conditions between the attachment grooves 81. Even in a single attachment groove 81, the surface conditions of the bottom surface 82 at any two positions that are away from each other are considerably different.

Variance in the finish of the attachment surface 83 of each of the positioning blocks 80 is smaller than that of the bottom surface 82, because finish of the attachment surface 83 is performed through a grinding process. Still, there is a small difference in the surface conditions between the positioning blocks 80. Even in a single positioning block 80, the surface conditions of the attachment surface 83 at any two positions that are away from each other are different. If the combination or the phase of the bottom surfaces 82 of the attachment grooves 81 and the attachment surfaces 83 of the positioning blocks 80 is changed, the positions of the axes of the cylindrical blocks are changed due to the difference in the surface conditions. Therefore, an error occurs in the state of assembly of the cylindrical blocks 61a, 61b, 61c, 61d, and 61e.

Therefore, the positioning blocks 80 are provided so as to correspond to the attachment grooves 81 on a one-to-one basis. To be specific, the correspondence between the attachment grooves 81 and the positioning blocks 80 is uniquely set so that, when reattaching the positioning blocks 80 to the attachment grooves 81 after temporarily removing the positioning blocks 80 from the attachment grooves 81, each of the positioning blocks 80 can always be attached to the attachment grooves 81 to which the positioning blocks 80 have been attached before being removed.

The phase with which each of the positioning blocks 80 is attached to a corresponding of the attachment grooves 81 is uniquely set with respect to the axial direction and the circumferential direction of the outer cylinder 61. To be specific, the phase of attachment of each of the positioning blocks 80 is set such that the positioning block 80 is attached to the corresponding attachment groove 81 in a predetermined orientation (phase) with respect to the up-down direction (axial direction) and the left-right direction (circumferential direction) of the outer cylinder 61.

In the example illustrated in the figures, positioning marks 85 and 86 are formed on the positioning blocks 80 and the corresponding attachment grooves 81 in order to uniquely set the correspondence between the positioning blocks 80 and the attachment grooves 81 and make the phases of the positioning blocks 80 and the attachment grooves 81 with respect to the axial direction and the circumferential direction of the outer cylinder 61 correspond to each other. That is, as illustrated in the figures, the positioning marks 86 are formed on the positioning blocks 80. Moreover, different pairs of positioning marks 85 and 86 are used for different combinations of the attachment grooves 81 and the positioning blocks 80 so that the correspondence between the attachment grooves 81 and the positioning blocks 80 becomes one-to-one.

Figure 9:
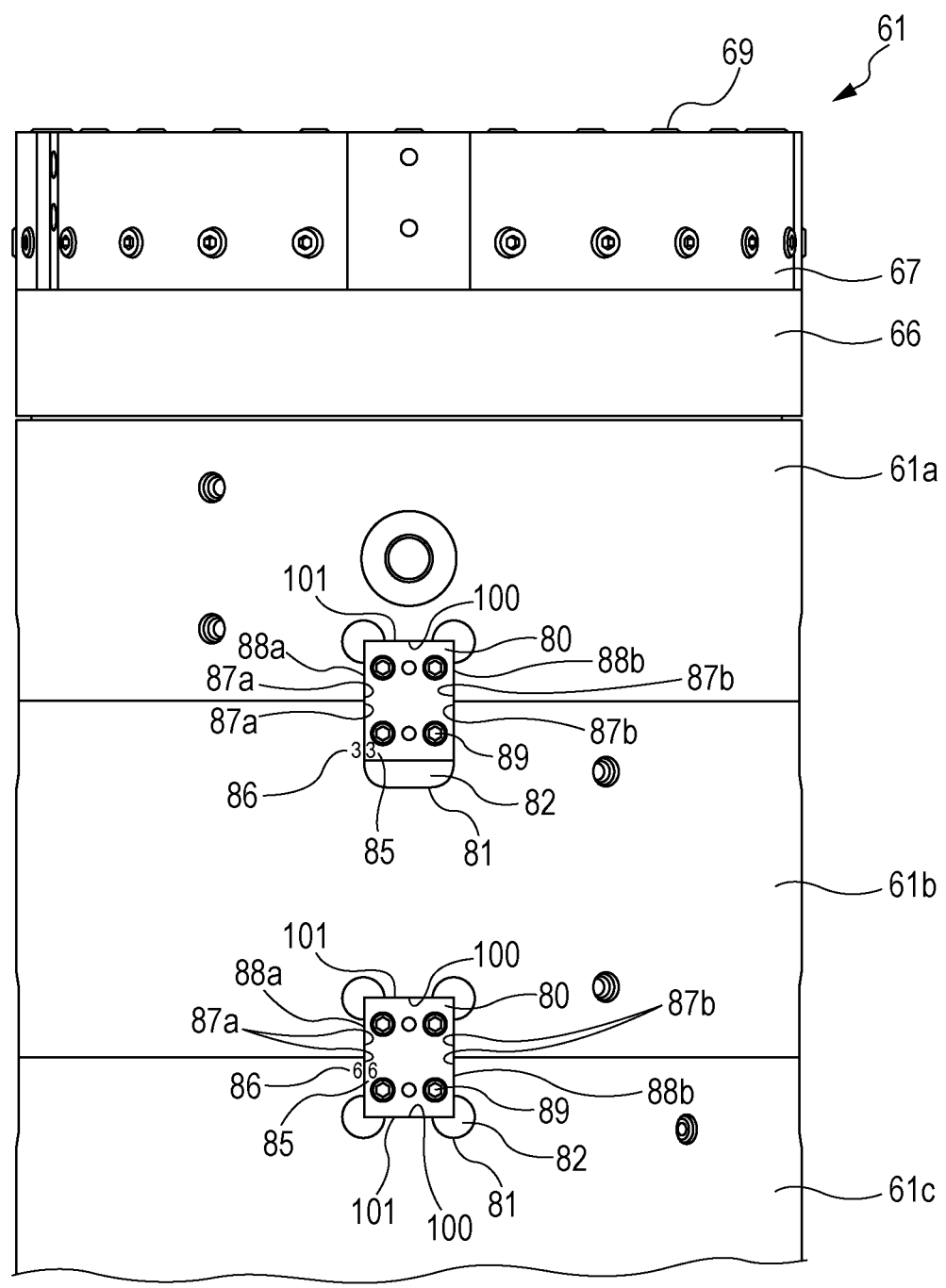
FIG. 9 is an enlarged partial side view of the outer cylinder of the rotary joint device according to the present invention.

To be specific, in the example illustrated in the figures, the combinations of the attachment grooves 80 and the positioning blocks 81 have different numbers of marks. Each of the positioning blocks 80 can be attached to a corresponding one of the attachment grooves 81 by attaching the positioning block 80 to the attachment groove 81 having the same number of the positioning marks 86 as that of the positioning marks 85 formed on itself, and thereby the correspondence between the positioning blocks 80 and the attachment grooves 81 is prevented from being changed. However, the positioning marks 85 and 86 need not be designed such that the combinations of the attachment grooves 81 and the positioning blocks 80 have different numbers of marks. Any types of the positioning marks 85 and 86 may be used as long as one combination of the attachment groove 81 and the positioning block 80 can be distinguished from another. For example, instead of the positioning marks 85 and 86 illustrated in FIG. 8, engraved numbers may be used as the positioning marks 85 and 86 as illustrated in FIG. 9.

In order to uniquely set the attachment phase of the positioning block 80 with respect to the attachment groove 81, the positioning marks 85 and 86 are formed so that the attachment phase of the positioning block 80 with respect to the attachment groove 81 becomes a predetermined attachment phase when the positioning marks 85 match the positioning marks 86. To be specific, the positioning mark 85 is formed near one of the four sides (the upper, lower, left, and right sides) on the front surface of the positioning block (that faces outward). The positioning mark 86 is formed at a position corresponding to that of the positioning mark 85 in the predetermined attachment phase of the positioning block 80. In the example illustrated in FIG. 8, the positioning mark 85 is formed at a position near the upper side of the front surface of the positioning block 80, and the positioning mark 86 is formed at a corresponding position on the attachment groove 81. Therefore, by attaching the positioning block 80 to the attachment groove 81 such that the positioning mark 85 matches the positioning mark 86, the positioning block 80 can be always attached with the predetermined phase. In the example illustrated in FIG. 8, the positioning mark 86 is disposed within the attachment groove 81. Instead, as illustrated in FIG. 9, the positioning mark 86 may be disposed outside the attachment groove 81 on the outer cylinder 61.

Even if the positioning blocks 80 are attached to the attachment grooves 81 at attachment positions that are displaced to some extent, such displacements do not influence in restoring the state of assembly of the cylindrical blocks 61a, 61b, 61c, 61d, and 61e of the outer cylinder 61 with high precision. Therefore, each of the positioning blocks 80 may have a dimension (height) in the up-down direction (axial direction) and a dimension (width) in the circumferential direction of the outer cylinder 61 that are smaller than those of a corresponding one of the attachment grooves 81, and the attachment positions thereof may be fixed by only bolts. To be specific, in the example illustrated in the figures, the positioning block 80 and the attachment groove 81 have substantially the same width. Alternatively, the width of the attachment groove 81 may be larger than that of the positioning block 80, and the attachment groove 81 may be fixed by using only four bolts 89. By making at least one of the height and width of the positioning block 80 be smaller than that of the attachment groove 81, the positioning block 80 can be attached and removed easily.

Considering the influence of grinding performed on the inner peripheral surface (through-hole 64) of the outer cylinder 61, it is preferable that the width of the positioning block 80 be substantially the same as the width of the attachment groove 81. The reason for this is as follows. When grinding the through-hole 64, a large external force in the circumferential direction is applied to the inner peripheral surface of the through-hole 64. The relative positions of a pair of adjacent cylindrical blocks in the circumferential direction are fixed by a frictional force generated between end surfaces (surfaces at which the adjacent cylindrical blocks are in contact with each other) due to axial forces of the attachment bolts that connect the adjacent cylindrical blocks to each other in the axial direction. If the external force in the circumferential direction exceeds the frictional force, the cylindrical block to which the external force is applied becomes displaced in the circumferential direction within a range of plays between the bolt holes in the positioning block and the bolts 89, and thereby the axis of the cylindrical block fails to coincide with that of the outer cylinder 61.

To prevent this, in the present embodiment, the width of the positioning block 80 is set to be substantially the same as the width of the attachment groove 81. To be specific, as illustrated in FIG. 8, inner side surfaces 87a and 87b of each of the attachment grooves 81, which extend in the axial direction, are machined, as with the bottom surface 82, to form flat surfaces in a state in which a pair of adjacent cylindrical blocks are combined. Side surfaces 88a and 88b of the positioning block 80, which correspond to the inner side surfaces 87a and 87b of the attachment groove 81, are machined to form flat surfaces in a state in which the pair of adjacent cylindrical blocks are combined. Moreover, each of the positioning blocks 80 is machined such that the width thereof substantially coincides with the width of a corresponding one of the attachment grooves 81 but has a slight clearance relative to the width of the attachment groove 81. Thus, each positioning block 80 is attached to the corresponding attachment groove 81 such that the side surfaces 88a and 88b thereof come into contact with the inner side surfaces 87a and 87b with no gap therebetween. Thus, even if an excessively large external force is applied while grinding the inner peripheral surface of the outer cylinder 61, the cylindrical blocks of the outer cylinder 61 are prevented from becoming displaced in the circumferential direction.

In the example illustrated in the figures, the dimension of each positioning block 80 in the up-down direction is smaller than that of the corresponding attachment groove 81, and the attachment position in the up-down direction is fixed only by the bolts 89. However, as with the width, the dimension of the positioning block 80 in the up-down direction may be set to be substantially the same as that of the attachment groove 81, and thereby the attachment position of each positioning block 80 can be strictly and uniquely fixed. To be specific, instead of the structure illustrated in FIG. 8, as illustrated in FIG. 9, a contact surface 100 may be formed on at least one of the ends of the attachment groove 81 in the up-down direction, a corresponding upper surface 101 of the positioning block 80 may be made to contact the contact surface 100, and thereby the attachment position of the positioning block 80 in the up-down direction may be strictly (uniquely) fixed. In this case, as compared to the case where the attachment position is fixed only by bolts, a slight error in the state of assembly due to displacement between the positions of the bottom surface 82 and the attachment surface 83 in the up-down direction can be further reduced. As a result, the state in which the axes of the cylindrical blocks 61a, 61b, 61c, 61d, and 61e coincide with the axis of the outer cylinder 61 can be restored with higher precision.

With the outer cylinder 61 including the attachment grooves 81 and the positioning blocks 80, the positioning blocks 80 are attached to the corresponding attachment grooves 81 with predetermined attachment phases, and thereby each pair of adjacent cylindrical blocks are positioned with high precision at two or more positions on the outer peripheral surface of the outer cylinder 61 with respect to two or more different directions that are perpendicular to the axis of the outer cylinder 61. As a result, the state of assembly of the cylindrical blocks 61a, 61b, 61c, 61d, and 61e of the outer cylinder 61 can be maintained with high precision. Thus, when reassembling the outer cylinder 61 after temporarily disassembling the outer cylinder 61, the state of assembly of each pair of adjacent cylindrical blocks can be restored to a state before being disassembled, that is, a state in which the axes of each pair of adjacent cylindrical blocks of the present embodiment precisely coincide with each other.

In the rotary joint device according to the present invention, which includes the outer cylinder 61 having the structure described above, the through-hole 64 in the outer cylinder 61 is machined to have a desired inside diameter by grinding the inner peripheral surfaces 64a, 64b, 64c, 64d, and 64e of the cylindrical blocks 61a, 61b, 61c, 61d, and 61e as the inner peripheral surface of the integrated through-hole 64 in a state in which the cylindrical blocks 61a, 61b, 61c, 61d, and 61e are assembled.

To be specific, the inner peripheral surfaces 64a, 64b, 64c, 64d, and 64e of the cylindrical blocks 61a, 61b, 61c, 61d, and 61e are machined as follows.

(1) The adjacent cylindrical blocks 61d and 61e are assembled in the axial direction such that the phases thereof with respect to the circumferential direction correspond to each other by using the positioning pins 78.

(2) The positioning blocks 80 are fitted to the attachment grooves 81, which are formed in the outer periphery of the cylindrical blocks 61d and 61e at three positions, so as to straddle the adjacent cylindrical blocks 61d and 61e.

(3) At this time, each of the positioning blocks 80 is attached to the corresponding attachment groove 81 with a predetermined attachment phase with respect to the axial direction and the circumferential direction of the outer cylinder 61 by making the positioning mark 85 match the corresponding positioning mark 86.

(4) Then, the positioning block 80 is fixed to the attachment groove 81 by using four bolts 89. Thus, the bottom surfaces 82 of the attachment grooves 81 of the pair of adjacent cylindrical blocks are fixed to the same plane.

(5) In this state, the attachment bolts are inserted into the through-holes formed in an end surface of cylindrical block 61d, and the attachment bolts are screwed into a plurality of screw holes formed in an end surface of the cylindrical block 61e, and thereby the pair of adjacent cylindrical blocks 61d and 61e are joined in the axial direction.

(6) The outer cylinder 61 is integrally formed by assembling the cylindrical blocks by repeating the steps (1) to (5) for each pair of adjacent cylindrical blocks (pair of the cylindrical blocks 61c and 61d, pair of the cylindrical blocks 61b and 61c, and pair of the cylindrical blocks 61a and 61b).

(7) In a state in which the outer cylinder 61 has been assembled in this way, grinding of the through-hole 64, i.e. the inner peripheral surfaces 64a, 64b, 64c, 64d, and 64e of the cylindrical blocks 61a, 61b, 61c, 61d, and 61e is performed. Then, the through-hole 64 in the outer cylinder 61 is finished so as to have an inside diameter such that the diametrical clearance between the inner surface of the through-hole 64 and the rotating shaft 63 is equal to or smaller than 0.005 mm.

As described above, in the rotary joint device according to the present invention, each pair of adjacent cylindrical blocks 61a, 61b, 61c, 61d, and 61e of the outer cylinder 61 is positioned relative to each other with high precision by using the combination of the attachment grooves 81 and the positioning blocks 80 so that the positioned state can be maintained.

Then, in this state, the through-hole 64 in the outer cylinder 61 is ground so as to have a desired inside diameter.

Therefore, when the outer cylinder 61 is in a state of assembly in which the positioning blocks 80 have been attached to the corresponding attachment grooves 81 with predetermined attachment phases, the axes of the inner peripheral surfaces 64a, 64b, 64c, 64d, and 64e of the cylindrical blocks 61a, 61b, 61c, 61d, and 61e, which define the through-hole 64, coincide with one another. Moreover, in a state in which the rotating shaft 63 is inserted into the through-hole 64, the diametrical clearance between the cylindrical blocks 61a, 61b, 61c, 61d, and 61e and the rotating shaft 63 is equal to or smaller than 0.005 mm over the entire range.

As long as the state of assembly described above, i.e. the state in which the positioning blocks 80 are attached to the corresponding attachment grooves 81 with predetermined attachment phases, is maintained, the diametrical clearance between the through-hole 64 and the rotating shaft 63 can be maintained at the state described above. Thus, when reassembling the cylindrical blocks 61a, 61b, 61c, 61d, and 61e of the outer cylinder 61 after disassembling the outer cylinder 61, the positioning blocks 80, which have been temporarily removed, can be reattached to the corresponding attachment grooves 81 with predetermined attachment phases and thereby each pair of adjacent cylindrical blocks can be positioned relative to each other. As a result, the state of assembly of the outer cylinder 61 can be restored with high precision to the state before being disassembled (a state in which the axes of the cylindrical blocks 61a, 61b, 61c, 61d, and 61e of the present embodiment coincide with one another with high precision). Moreover, the diametrical clearance between the rotating shaft 63 and the inner peripheral surfaces 64a, 64b, 64c, 64d, and 64e of the cylindrical blocks 61a, 61b, 61c, 61d, and 61e, which define the through-hole 64, can be restored with high precision to the state before being disassembled.

Furthermore, in the present embodiment, the outer cylinder 61 is formed by assembling the cylindrical blocks 61a, 61b, 61c, 61d, and 61e, which have the same outside diameter and the same shape, such that the axes of the cylindrical blocks 61a, 61b, 61c, 61d, and 61e (the central axes of the outer peripheral circles) coincide with one another with high precision. Therefore, by using the outer peripheral surface of the outer cylinder 61 as a reference when grinding the through-hole 64 as described above, the axis of the through-hole 64 is prevented from being displaced (changed) after the through-hole 64 has been machined, and thereby an advantage in that a machining process such as re-chucking can be more flexibly selected. That is, the through-hole 64 is ground while holding the outer peripheral surface of the outer cylinder 61 with a chuck or the like. At this time, even if re-chucking is performed for convenience of machining, by grinding the through-hole 64 while making the axis of the through-hole 64 coincide with the axis of the outer cylinder 61 with reference to the outer peripheral surface of the outer cylinder 61, the axes of parts of the through-hole 64 on which grinding was performed before and after re-chucking do not become displaced from each other. In order to make the axes of the cylindrical blocks 61a, 61b, 61c, 61d, and 61e coincide with one another with higher precision, the outer peripheral surface of the outer cylinder 61 that is integrally formed may be ground before grinding the through-hole 64.

Heretofore, an embodiment of the present invention has been described. A rotary joint device according to the present invention is not limited to the embodiment described above, and the embodiment can be modified as described below.

In the embodiment, the cylindrical blocks 61a, 61b, 61c, 61d, and 61e of the outer cylinder 61 are assembled such that the axes thereof coincide with one another with high precision, and in this state, the through-hole 64 is ground so as to have a desired inside diameter around the axis of the outer cylinder 61. Alternatively, however, the cylindrical blocks 61a, 61b, 61c, 61d, and 61e of the outer cylinder 61 may be assembled such that the axes thereof do not coincide with one another.

That is, even in a case where the axes of the cylindrical blocks 61a, 61b, 61c, 61d, and 61e do not coincide with one another, the state of the axes of the inner peripheral surfaces 64a, 64b, 64c, 64d, and 64e, which define the through-hole 64, can be restored with high precision to the state before being disassembled through the following procedure. First, the positioning blocks 80 are attached to the attachment grooves 81 of the assembled outer cylinder 61. Second, when reassembling the cylindrical blocks 61a, 61b, 61c, 61d, and 61e of the outer cylinder 61 after disassembling the outer cylinder 61, the positioning blocks 80, which have been temporarily removed from the attachment grooves 81, are reattached to the bottom surfaces 82 of the attachment grooves 81, to which the positioning blocks 80 were attached before being removed, so as to correspond to the attachment grooves on a one-to-one basis and so as to restore the original uniquely-set attachment phases with respect to the axial direction and the circumferential direction of the outer cylinder 61; and thereby restoring the original state of assembly of the outer cylinder 61.

In the embodiment, the attachment grooves 81 are formed at three positions on the outer periphery of the outer cylinder 61 such that the phase thereof is shifted by 90 degrees for each pair of adjacent cylindrical blocks. However, this is not necessarily the case. That is, in the present invention, it is sufficient that the attachment grooves 81 be formed at two or more positions on the outer periphery of the outer cylinder 61 for each pair of adjacent cylindrical blocks. Therefore, the attachment grooves 81 may be formed at two positions or four or more positions. The phase shift between the attachment grooves 81 on the outer periphery of the outer cylinder 61 is not limited to 90 degrees. However, regarding positioning, it is preferable that the attachment grooves be positioned in different directions that are perpendicular to each other as in the embodiment. Regarding an external force in the circumferential direction that is applied due to grinding of the through-hole 64, it is preferable, as in the embodiment, that an additional attachment groove 81 be provided for at least one of the attachment grooves 81 with a 180 degrees shift in phase so that the external force can be supported at two opposite positions on the outer peripheral surface of the outer cylinder 61.

In the embodiment, for each pair of adjacent cylindrical blocks, the attachment grooves 81 are machined in a state in which the pair of cylindrical blocks are combined. However, this is not necessarily the case. For example, in a state in which the outer cylinder 61 is integrally formed by assembling the cylindrical blocks 61a, 61b, 61c, 61d, and 61e, the attachment grooves 81 between each pair of adjacent cylindrical blocks may be machined. After machining the attachment grooves 81, the positioning blocks 80 may be attached to the corresponding attachment grooves 81 without disassembling the outer cylinder 61, and then the inner peripheral surfaces 64a, 64b, 64c, 64d, and 64e may be ground. By doing so, an error in the state of assembly of the outer cylinder 61 due to the fastening force of the attachment bolts that join the cylindrical blocks in the axial direction can be reduced, and thereby the state of assembly before disassembling the outer cylinder 61 can be restored with high precision.

In the embodiment, each of the two bearings 62a and 62b is an angular contact ball bearing. However, this is not necessarily the case. Each of the bearings 62a and 62b may be a roller bearing having a shaft-alignment function, such as a self-aligning roller bearing, a triple roller bearing, or the like. If a clearance between the through-hole 64 and the rotating shaft 63 is allowed to exist, a ball bearing or a roller bearing that does not have a shaft-alignment function may be used.

In the embodiment, the rotary joint device 60 according to the present invention is applied to the C-axis driving apparatus 30 for a machine tool. However, this is not necessarily the case. Alternatively, the rotary joint device 60 may be applied to the main shaft driving apparatus of the spindle unit 20 that rotates the spindle 21 to which a tool is attached, the main shaft driving apparatus of the machining head 10 that supports the spindle unit 20, or the like. Further alternatively, the rotary joint device 60 may be applied to the driving apparatus of a rotary table device that rotates the main shaft of a rotary table, which is a device to be rotated and to which a jig or a workpiece is fixed.

What is claimed is:

1. A rotary joint device comprising:
   an outer cylinder including a plurality of cylindrical blocks combined in an axial direction;
   a rotating shaft rotatably supported in the outer cylinder by two bearing that are disposed away from each other in the axial direction of the outer cylinder;
   at least one fluid channel formed in each of the cylindrical blocks of the outer cylinder, each of the fluid channels having an opening in an inner peripheral surface of a corresponding one of the cylindrical blocks;
   a connection groove provided so as to correspond to each of the fluid channels and formed in at least one of an inner peripheral surface of a corresponding one of the cylindrical blocks and an outer peripheral surface of the rotating shaft facing the inner peripheral surface, each of the connection grooves having an annular shape and communicating with a corresponding one of the fluid channels, the fluid channels in the outer cylinder and fluid channels formed in the rotating shaft so as to communicate with the connection grooves communicating with each other through the connection grooves;
   a plurality of attachment grooves formed at a plurality of positions in an outer peripheral surface of the outer cylinder, each of the attachment grooves being formed so as to straddle a pair of adjacent cylindrical blocks and so as to be exposed from the outer peripheral surface of the outer cylinder, each of the attachment grooves having a bottom surface that is machined to form a flat surface in a state in which the pair of cylindrical blocks are combined; and
   a plurality of positioning blocks corresponding to the plurality of attachment grooves on a one-to-one basis and each having an attachment phase that is uniquely set with respect to a corresponding one of the attachment grooves in the axial direction and in a circumferential direction of the outer cylinder, each of the positioning blocks having an attachment surface corresponding to the bottom surface of a corresponding one of the attachment grooves, the attachment surface being machined so as to form a flat surface.

2. The rotary joint device according to claim 1, wherein the bearings are disposed at both ends of the outer cylinder that is integrally formed by assembling the cylindrical blocks and each of the bearings has a structure that does not cause displacement of a shaft axis.

3. A method of machining a rotary joint device,
   the rotary joint device including
   an outer cylinder including a plurality of cylindrical blocks combined in an axial direction,
   a rotating shaft rotatably supported in the outer cylinder by two bearing that are disposed away from each other in the axial direction of the outer cylinder,
   at least one fluid channel formed in each of the cylindrical blocks of the outer cylinder, each of the fluid channels having an opening in an inner peripheral surface of a corresponding one of the cylindrical blocks, and
   a connection groove provided so as to correspond to each of the fluid channels and formed in at least one of an inner peripheral surface of a corresponding one of the cylindrical blocks and an outer peripheral surface of the rotating shaft facing the inner peripheral surface, each of the connection grooves having an annular shape and communicating with a corresponding one of the fluid channels, the fluid channels in the outer cylinder and fluid channels formed in the rotating shaft so as to communicate with the connection grooves communicating with each other through the connection grooves,
   the method comprising:
   forming a plurality of attachment grooves at a plurality of positions in an outer peripheral surface of the outer cylinder at which each of the attachment grooves straddles a pair of adjacent cylindrical blocks, each of the attachment grooves having a bottom surface that is machined to form a flat surface in a state in which the pair of cylindrical blocks are combined, the attachment grooves being formed so as to be exposed from the outer peripheral surface of the outer cylinder;
   attaching a plurality of positioning blocks such that each of the positioning blocks straddles a pair of adjacent cylindrical blocks, the positioning blocks corresponding on a one-to-one basis to the attachment grooves and each having an attachment phase that is uniquely set with respect to a corresponding one of the attachment grooves in the axial direction and in a circumferential direction of the outer cylinder, each of the positioning blocks having an attachment surface corresponding to the bottom surface of a corresponding one of the attachment grooves, the attachment surface being machined so as to form a flat surface; and
   grinding an inner peripheral surface of the outer cylinder in a state in which bottom surfaces of the attachment grooves of pairs of the adjacent cylindrical blocks are fixed to the same plane by using the positioning blocks.

4. A main shaft driving apparatus for a machine tool comprising:
   the rotary joint device according to claim 1 or 2;
   a main shaft connected to the rotating shaft of the rotary joint device; and
   a driving device that rotates the main shaft,
   wherein the driving device is a direct drive motor including a motor rotor and a motor stator, the motor rotor being coaxially disposed around the main shaft and connected to the main shaft, the motor stator being disposed on a frame of the main shaft driving apparatus so as to face an outer periphery or an inner periphery of the motor rotor.

* * * * *